United States Patent
Dai et al.

(10) Patent No.: US 12,292,550 B2
(45) Date of Patent: May 6, 2025

(54) OPTICAL IMAGING LENS ASSEMBLY INCLUDING SEVEN LENSES OF −+−+−+− OR −+−+−−− REFRACTIVE POWERS

(71) Applicant: Zhejiang Sunny Optics Co., Ltd, Yuyao (CN)

(72) Inventors: Fujian Dai, Yuyao (CN); Wuchao Xu, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 817 days.

(21) Appl. No.: 17/403,261

(22) Filed: Aug. 16, 2021

(65) Prior Publication Data
US 2022/0137366 A1    May 5, 2022

(30) Foreign Application Priority Data
Nov. 3, 2020   (CN) .......................... 202011211407.0

(51) Int. Cl.
G02B 13/00    (2006.01)
G02B 9/64     (2006.01)

(52) U.S. Cl.
CPC ........... G02B 13/0045 (2013.01); G02B 9/64 (2013.01)

(58) Field of Classification Search
CPC .............................. G02B 13/0045; G02B 9/64
See application file for complete search history.

(56) References Cited

U.S. PATENT DOCUMENTS

| | | |
|---|---|---|
| 2011/0249346 A1 | 10/2011 | Tang et al. |
| 2019/0121096 A1 | 4/2019 | Hu et al. |
| 2019/0170966 A1 | 6/2019 | Wenren et al. |
| 2020/0233180 A1 | 7/2020 | Hsueh et al. |
| 2024/0219689 A1* | 7/2024 | Jung .................. G02B 27/0025 |

FOREIGN PATENT DOCUMENTS

| | | |
|---|---|---|
| CN | 111123478 A | 5/2020 |
| CN | 111399190 A | 7/2020 |
| CN | 111522130 A | 8/2020 |
| CN | 111766682 A | 10/2020 |

(Continued)

OTHER PUBLICATIONS

First Examination Report for application 202114057415, dated May 11, 2022, 5 pages.

(Continued)

*Primary Examiner* — Wen Huang
(74) *Attorney, Agent, or Firm* — Barnes & Thornburg LLP

(57) ABSTRACT

An optical imaging lens assembly including a first lens, a second lens, a third lens, a fourth lens, a fifth lens, a sixth lens, and a seventh lens sequentially from an object side to an image side along an optical axis is provided. The first lens has a negative refractive power, an object-side surface thereof is a concave surface, and an image-side surface thereof is a convex surface; and the third lens has a negative refractive power. The distance TTL from the object-side surface of the first lens to the imaging surface of the optical imaging lens assembly on the optical axis and a half ImgH of the diagonal length of the effective pixel region on the imaging surface of the optical imaging lens assembly satisfy: TTL/ImgH≤1.4.

19 Claims, 12 Drawing Sheets

(56) References Cited

FOREIGN PATENT DOCUMENTS

| | | |
|---|---|---|
| CN | 213091999 U | 4/2021 |
| CN | 114063264 A | 2/2022 |
| JP | 2015072404 A | 4/2015 |
| JP | 2020144241 A | 9/2020 |

OTHER PUBLICATIONS

Chinese Office Action for Application No. 202011211407.0, dated Sep. 12, 2024, 7 pages.
Notice of Allowance and Notification on Registration Formalities for Application CN202011211407.0, dated Oct. 12, 2024, 4 pages.

* cited by examiner

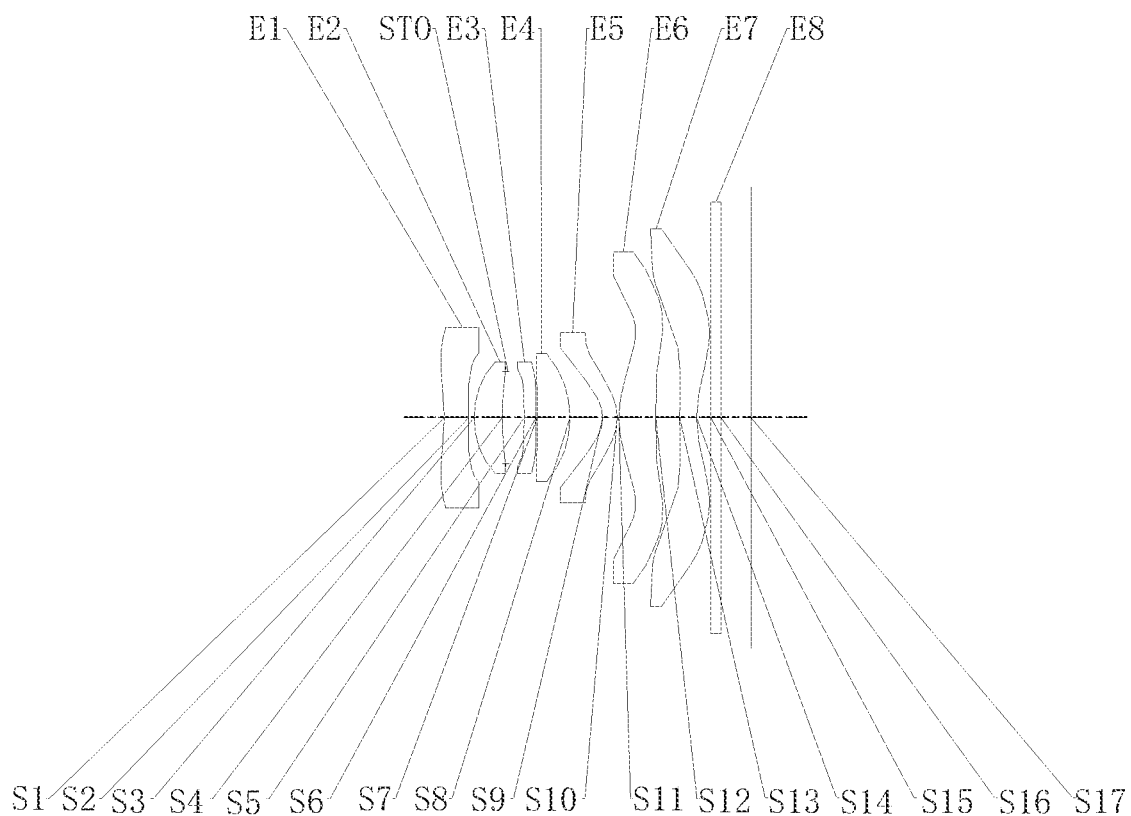
Fig. 1
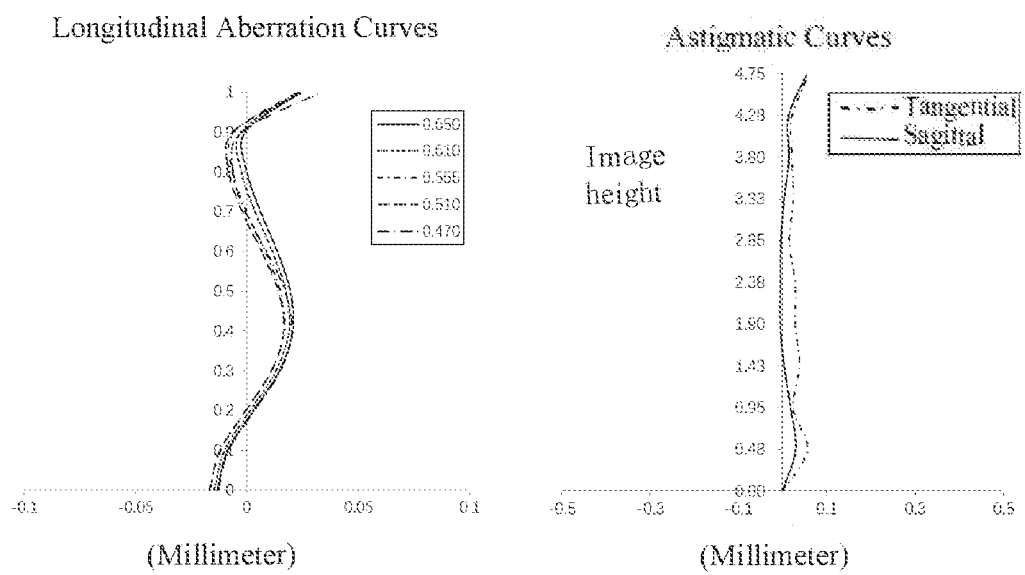
Fig. 2A
Fig. 2B

OPTICAL IMAGING LENS ASSEMBLY INCLUDING SEVEN LENSES OF −+−+−+− OR −+−+−−− REFRACTIVE POWERS

CROSS-REFERENCE TO RELATED APPLICATIONS

This application claims the priority of Chinese Patent Application No. 202011211407.0, titled "OPTICAL IMAGING LENS ASSEMBLY", filed on Nov. 3, 2020, the content of which is incorporated herein by reference in its entirety.

TECHNICAL FIELD

The present disclosure relates to the field of optical elements, and specially, to an optical imaging lens assembly.

BACKGROUND

With the rapid development of electronic products, the application of optical imaging lens assemblies is becoming more and more widespread. As electronic products tend to be lighter and thinner, their optical imaging lens assemblies not only need to have good image quality, but also need to have a light and thin appearance, so that the cost of the products can be effectively reduced and the design is more humanized.

Currently, most of the photosensitive elements used in the market for optical imaging lens assemblies are Charge Coupled Device (CCD) or Complementary Metal-Oxide Semiconductor Sensor (CMOS Sensor). With the development of the semiconductor processing technology, the pixel size of the photosensitive element is continuously reduced, so that an optical imaging lens assembly mounted on an electronic product such as a mobile phone or a digital camera is gradually developed in the fields of miniaturization, large field of view, high pixels, and the like.

SUMMARY

In one aspect, the present disclosure provides an optical imaging lens assembly including a first lens, a second lens, a third lens, a fourth lens, a fifth lens, a sixth lens, and a seventh lens sequentially from an object side to an image side along an optical axis; the first lens has a negative refractive power, an object-side surface thereof is a concave surface, and an image-side surface thereof is a convex surface; the third lens has a negative refractive power; and a distance TTL from the object-side surface of the first lens to an imaging surface of the optical imaging lens assembly on the optical axis and a half ImgH of a diagonal length of an effective pixel region on the imaging surface of the optical imaging lens assembly satisfy: $TTL/ImgH \leqslant 1.4$.

In one embodiment, there is at least one aspheric surface in surfaces from the object-side surface of the first lens to the image-side surface of the seventh lens.

In one embodiment, an effective focal length f2 of the second lens, a radius R3 of curvature of an object-side surface of the second lens, and a radius R4 of curvature of an image-side surface of the second lens satisfy: $3.0 \leqslant |f2/R3+f2/R4| \leqslant 4.0$.

In one embodiment, a radius R9 of curvature of an object-side surface of the fifth lens and a radius R10 of curvature of an image-side surface of the fifth lens may satisfy: $1.5 \leqslant (R9+R10)/R10 \leqslant 2.0$.

In one embodiment, a center thickness CT2 of the second lens on the optical axis, a center thickness CT3 of the third lens on the optical axis, and a spaced interval T23 between the second lens and the third lens on the optical axis may satisfy: $1.5 \leqslant (CT2+CT3)/T23 \leqslant 2.5$.

In one embodiment, a total effective focal length f of the optical imaging lens assembly and a combined focal length f123 of the first lens, the second lens and the third lens may satisfy: $2.5 \leqslant f123/f \leqslant 5.0$.

In one embodiment, a central thickness CT5 of the fifth lens on the optical axis, an on-axis distance SAG51 from an intersection of an object-side surface of the fifth lens and the optical axis to a vertex of an effective radius of the object-side surface of the fifth lens, and an on-axis distance SAG52 from an intersection of an image-side surface of the fifth lens and the optical axis to a vertex of an effective radius of the image-side surface of the fifth lens may satisfy: $3.2 \leqslant (SAG51+SAG52)/CT51 \leqslant 5.5$.

In one embodiment, a radius R9 of curvature of an object-side surface of the fifth lens, a radius R10 of curvature of an image-side surface of the fifth lens, and an edge thickness ET5 of the fifth lens may satisfy: $3.0 \leqslant |(R9+R10)/ET5| \leqslant 4.2$.

In one embodiment, a radius R3 of curvature of an object-side surface of the second lens, a radius R4 of curvature of an image-side surface of the second lens, and a combined focal length f12 of the first lens and the second lens may satisfy: $3.8 \leqslant f12/R3+f12/R4 \leqslant 4.8$.

In one embodiment, a radius R14 of curvature of the image-side surface of the seventh lens, an on-axis distance SAG71 from an intersection of an object-side surface of the seventh lens and the optical axis to a vertex of an effective radius of the object-side surface of the seventh lens, and an on-axis distance SAG72 from an intersection of an image-side surface of the seventh lens and the optical axis to a vertex of an effective radius of the image-side surface of the seventh lens may satisfy: $4.0 \leqslant |R14/SAG71+R14/SAG72| \leqslant 8.0$.

In one embodiment, an effective focal length f4 of the fourth lens and a half Semi-FOV of the maximum field-of-view of the optical imaging lens assembly may satisfy: $|f4 \times \tan(Semi\text{-}FOV)| < 6.0$ mm.

In one embodiment, a distance TTL from the object-side surface of the first lens to the imaging surface of the optical imaging lens assembly on the optical axis, the total effective focal length f of the optical imaging lens assembly, and a half Semi-FOV of the maximum field-of-view of the optical imaging lens assembly may satisfy: $16 \text{ mm}^2 \leqslant TTL \times f/\tan(Semi\text{-}FOV) \leqslant 18 \text{ mm}^2$.

In one embodiment, the sum ΣCT of the center thicknesses of the first lens to the seventh lens on the optical axis and the center thickness CT6 of the sixth lens on the optical axis may satisfy: $CT6/\Sigma CT \leqslant 0.3$.

In one embodiment, the sum ΣCT of the center thicknesses of the first lens to the seventh lens on the optical axis and the sum ΣAT of the spaced intervals of any two adjacent lenses in the first lens to the seventh lens on the optical axis may satisfy: $1.8 \leqslant \Sigma CT/\Sigma AT \leqslant 3.0$.

In another aspect, the present disclosure provides an optical imaging lens assembly including a first lens, a second lens, a third lens, a fourth lens, a fifth lens, a sixth lens, and a seventh lens sequentially from an object side to an image side along an optical axis; the first lens has a negative refractive power, an object-side surface thereof is a concave surface, and an image-side surface thereof is a convex surface; the fourth lens has a positive refractive power; and the distance TTL from the object-side surface of the first lens to the imaging surface of the optical imaging lens assembly on the optical axis and a half ImgH of a diagonal length of an effective pixel region on the imaging surface of the optical imaging lens assembly may satisfy TTL/ImgH ⩽ 1.35.

In one embodiment, an effective focal length f2 of the second lens, a radius R3 of curvature of an object-side surface of the second lens, and a radius R4 of curvature of an image-side surface of the second lens may satisfy: 3.0⩽ |f2/R3+f2/R4|⩽ 4.0.

In one embodiment, a radius R9 of curvature of an object-side surface of the fifth lens and a radius R10 of curvature of an image-side surface of the fifth lens satisfy: 1.5⩽ (R9+R10)/R10⩽ 2.0.

In one embodiment, a center thickness CT2 of the second lens on the optical axis, a center thickness CT3 of the third lens on the optical axis, and a spaced interval T23 between the second lens and the third lens on the optical axis may satisfy: 1.5⩽ (CT2+CT3)/T23⩽ 2.5.

In one embodiment, a total effective focal length f of the optical imaging lens assembly and a combined focal length f123 of the first lens, the second lens and the third lens may satisfy: 2.5⩽ f123/f⩽ 5.0.

In one embodiment, a central thickness CT5 of the fifth lens on the optical axis, an on-axis distance SAG51 from an intersection of an object-side surface of the fifth lens and the optical axis to a vertex of an effective radius of the object-side surface of the fifth lens, and an on-axis distance SAG52 from an intersection of an image-side surface of the fifth lens and the optical axis to a vertex of an effective radius of the image-side surface of the fifth lens may satisfy: 3.2⩽ |(SAG51+SAG52)/CT5|⩽ 5.5.

In one embodiment, a radius R9 of curvature of an object-side surface of the fifth lens, a radius R10 of curvature of an image-side surface of the fifth lens, and an edge thickness ET5 of the fifth lens may satisfy: 3.0⩽ |(R9+R10)/ET5|⩽ 4.2.

In one embodiment, a radius R3 of curvature of an object-side surface of the second lens, a radius R4 of curvature of an image-side surface of the second lens, and a combined focal length f12 of the first lens and the second lens may satisfy 3.8⩽ f12/R3+f12/R4⩽ 4.8.

In one embodiment, a radius R14 of curvature of the image-side surface of the seventh lens, an on-axis distance SAG71 from an intersection of an object-side surface of the seventh lens and the optical axis to a vertex of an effective radius of the object-side surface of the seventh lens, and an on-axis distance SAG72 from an intersection of an image-side surface of the seventh lens and the optical axis to a vertex of an effective radius of the image-side surface of the seventh lens may satisfy: 4.0⩽ |R14/SAG71+R14/SAG72|⩽ 8.0.

In one embodiment, an effective focal length f4 of the fourth lens and a half Semi-FOV of the maximum field-of-view of the optical imaging lens assembly may satisfy: |f4×tan(Semi-FOV)|<6.0 mm.

In one embodiment, a distance TTL from the object-side surface of the first lens to the imaging surface of the optical imaging lens assembly on the optical axis, the total effective focal length f of the optical imaging lens assembly, and a half Semi-FOV of the maximum field-of-view of the optical imaging lens assembly may satisfy: 16 mm² ⩽ TTL×f/tan (Semi-FOV)⩽ 18 mm².

In one embodiment, a sum ΣCT of the center thicknesses of the first lens to the seventh lens on the optical axis and the center thickness CT6 of the sixth lens on the optical axis may satisfy: CT6/ΣCT⩽ 0.3.

In one embodiment, the sum ΣCT of the center thicknesses of the first lens to the seventh lens on the optical axis and the sum ΣAT of the spaced intervals of any two adjacent lenses in the first lens to the seventh lens on the optical axis may satisfy: 1.8⩽ ΣCT/ΣAT⩽ 3.0.

In another aspect, the present disclosure provides an optical imaging lens assembly. The optical imaging lens assembly includes a first lens, a second lens, a third lens, a fourth lens, a fifth lens, a sixth lens, and a seventh lens sequentially from an object side to an image side along an optical axis; the first lens has a negative refractive power, an object-side surface thereof is a concave surface, and an image-side surface thereof is a convex surface: the third lens has a negative refractive power; and the effective focal length f4 of the fourth lens and a half Semi-FOV of the maximum field-of-view of the optical imaging lens assembly may satisfy |f4×tan (Semi-FOV)|⩽ 6.0 mm.

In one embodiment, an effective focal length f2 of the second lens, a radius R3 of curvature of an object-side surface of the second lens, and a radius R4 of curvature of an image-side surface of the second lens may satisfy: 3.0⩽ |f2/R3+f2/R4|⩽ 4.0.

In one embodiment, a radius R9 of curvature of an object-side surface of the fifth lens and a radius R10 of curvature of an image-side surface of the fifth lens may satisfy: 1.5⩽ (R9+R10)/R10⩽ 2.0.

In one embodiment, a center thickness CT2 of the second lens on the optical axis, a center thickness CT3 of the third lens on the optical axis, and a spaced interval T23 between the second lens and the third lens on the optical axis may satisfy: 1.5⩽ (CT2+CT3)/T23⩽ 2.5.

In one embodiment, a total effective focal length f of the optical imaging lens assembly and a combined focal length f123 of the first lens, the second lens and the third lens may satisfy: 2.5⩽ f123/f⩽ 5.0.

In one embodiment, a central thickness CT5 of the fifth lens on the optical axis, an on-axis distance SAG51 from an intersection of an object-side surface of the fifth lens and the optical axis to a vertex of an effective radius of the object-side surface of the fifth lens, and an on-axis distance SAG52 from an intersection of an image-side surface of the fifth lens and the optical axis to a vertex of an effective radius of the image-side surface of the fifth lens may satisfy: 3.2⩽ |(SAG51+SAG52)/CT5|⩽ 5.5.

In one embodiment, a radius R9 of curvature of an object-side surface of the fifth lens, a radius R10 of curvature of an image-side surface of the fifth lens, and an edge thickness ET5 of the fifth lens may satisfy: 3.0⩽ |(R9+R10)/ET5|⩽ 4.2.

In one embodiment, a radius R3 of curvature of an object-side surface of the second lens, a radius R4 of curvature of an image-side surface of the second lens, and a combined focal length f12 of the first lens and the second lens may satisfy 3.8⩽ f12/R3+f12/R4⩽ 4.8.

In one embodiment, a radius R14 of curvature of the image-side surface of the seventh lens, an on-axis distance SAG71 from an intersection of an object-side surface of the seventh lens and the optical axis to a vertex of an effective radius of the object-side surface of the seventh lens, and an on-axis distance SAG72 from an intersection of an image-side surface of the seventh lens and the optical axis to a vertex of an effective radius of the image-side surface of the seventh lens may satisfy: 4.0⩽ |R14/SAG71+R14/SAG72|⩽ 8.0.

In one embodiment, the distance TTL from the object-side surface of the first lens to the imaging surface of the optical imaging lens assembly on the optical axis and a half ImgH of a diagonal length of an effective pixel region on the imaging surface of the optical imaging lens assembly may satisfy: TTL/ImgH≤ 1.35.

In one embodiment, a distance TTL from the object-side surface of the first lens to the imaging surface of the optical imaging lens assembly on the optical axis, the total effective focal length f of the optical imaging lens assembly, and a half Semi-FOV of the maximum field-of-view of the optical imaging lens assembly may satisfy: 16 mm² ≤ TTL×f/tan (Semi-FOV)≤ 18 mm².

In one embodiment, a sum ΣCT of the center thicknesses of the first lens to the seventh lens on the optical axis and the center thickness CT6 of the sixth lens on the optical axis may satisfy: CT6/ΣCT≤ 0.3.

In one embodiment, the sum ΣCT of the center thicknesses of the first lens to the seventh lens on the optical axis and the sum ΣAT of the spaced intervals of any two adjacent lenses in the first lens to the seventh lens on the optical axis may satisfy: 1.8≤ ΣCT/ΣAT≤ 3.0.

BRIEF DESCRIPTION OF THE DRAWINGS

Other features, objects, and advantages of the present disclosure will become more apparent from the following detailed description of the non-limiting embodiments with reference to the accompanying drawings:

FIG. 1 shows a schematic structural diagram of an optical imaging lens assembly according to example 1 of the present disclosure;

FIGS. 2A to 2D show longitudinal aberration curves, astigmatic curves, a distortion curve, and a lateral color curve of the optical imaging lens assembly of example 1 respectively;

DETAILED DESCRIPTION OF EMBODIMENTS

Figure 2C:
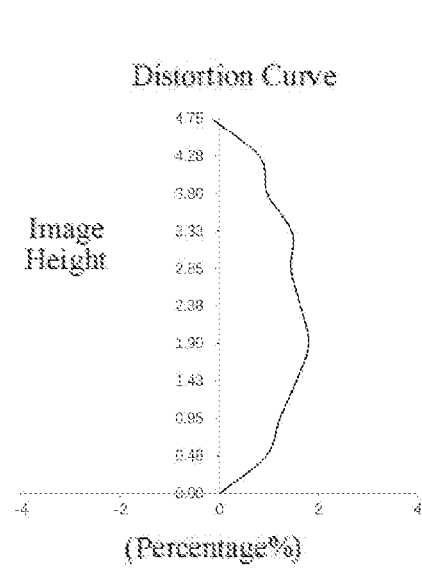

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may,"

when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

Some examples of the present disclosure provide an optical imaging lens assembly that is suitable for portable electronic products and has a lightweight, large aperture, miniaturized, and good imaging quality by reasonably distributing refractive power and optimizing optical parameters.

An optical imaging lens assembly according to an exemplary embodiment of the present disclosure may include seven lenses having refractive power, which are a first lens, a second lens, a third lens, a fourth lens, a fifth lens, a sixth lens, and a seventh lens, respectively. The seven lenses are arranged sequentially along the optical axis from the object side to the image side. Any two adjacent lenses in the first lens to the seventh lens may have spaced apart distances.

In an exemplary embodiment, the first lens may have a negative refractive power with a concave object-side surface and a convex image-side surface. This arrangement of refractive power and surface type of the first lens, which may well balance the field curvature of each field of view.

In an exemplary embodiment, the third lens may have a negative refractive power. The third lens has a negative refractive power, which is beneficial for reducing the distortion of the off-axis field of view, and for obtaining a better imaging effect.

In an exemplary embodiment, the fourth lens may have a positive refractive power. The fourth lens has a positive refractive power, which is beneficial for reducing the axial chromatic spherical aberration of the optical imaging lens assembly, and obtaining a larger aperture angle.

In the exemplary embodiment, by rationally setting the refractive power and the surface-type of the first lens to the seventh lens, the imaging performance of the optical imaging lens assembly may be ensured, while the optical imaging lens assembly can have characteristics such as a high pixel, a large aperture, and a large field of view.

In an exemplary embodiment, the optical imaging lens assembly according to the present disclosure may satisfy $TTL/ImgH \leqslant 1.4$, where TTL is the distance from the object-side surface of the first lens to the imaging surface of the optical imaging lens assembly on the optical axis, and ImgH is a half of the diagonal length of the effective pixel area on the imaging surface of the optical imaging lens assembly. More specifically, TTL and ImgH may further satisfy: $TTL/ImgH \leqslant 1.35$. Satisfying $TTL/ImgH \leqslant 1.4$ is advantageous to make the optical imaging lens assembly ultra-thin and miniaturized.

In an exemplary embodiment, the optical imaging lens assembly according to the present disclosure may satisfy: $3.0 \leqslant |f2/R3+f2/R4| \leqslant 4.0$, where f2 is the effective focal length of the second lens, R3 is the radius of curvature of the object-side surface of the second lens, and R4 is the radius of curvature of the image-side surface of the second lens. More specifically, f2, R3 and R4 may further satisfy: $3.4 \leqslant f2/R3+f2/R4 \leqslant 3.8$. Satisfying $3.0 \leqslant |f2/R3+f2/R4| \leqslant 4.0$ is advantageous for correcting the spherical aberration and the longitudinal aberration of the optical imaging lens assembly, improving the imaging quality, and facilitating the optical imaging lens assembly to have characteristics such as a large aperture and a large field of view.

In an exemplary embodiment, the optical imaging lens assembly according to the present disclosure may satisfy $1.5 \leqslant (R9+R10)/R10 \leqslant 2.0$, where R9 is the radius of curvature of the object-side surface of the fifth lens and R10 is the radius of curvature of the image-side surface of the fifth lens. More specifically, R9 and R10 may further satisfy: $1.6 \leqslant (R9+R10)/R10 \leqslant 1.9$. Satisfying $1.5 \leqslant (R9+R10)/R10 \leqslant 2.0$ facilitates correction of astigmatism of the off-axis field of the optical imaging lens assembly and improves imaging quality.

In an exemplary embodiment, the optical imaging lens assembly according to the present disclosure may satisfy: $1.5 \leqslant (CT2+CT3)/T23 \leqslant 2.5$, where CT2 is the center thickness of the second lens on the optical axis. CT3 is the center thickness of the third lens on the optical axis, and T23 is the spaced interval between the second lens and the third lens on the optical axis. More specifically, CT2, CT3, and T23 may further satisfy: $1.7 \leqslant (CT2+CT3)/T23 \leqslant 2.2$. Satisfying $1.5 \leqslant (CT2+CT3)/T23 \leqslant 2.5$ is beneficial for ensuring the compact structure of the optical imaging lens assembly, reducing the sensitivity of the spacing distance to the field curvature, and improving the assembly yield of the lens.

In an exemplary embodiment, the optical imaging lens assembly according to the present disclosure may satisfy: $2.5 \leqslant f123/f \leqslant 5.0$, where f is the total effective focal length of the optical imaging lens assembly, and f123 is the combined focal length of the first lens, the second lens, and the third lens. More specifically, f123 and f may further satisfy: $2.6 \leqslant f123/f \leqslant 4.8$. By satisfying $2.5 \leqslant f123/f \leqslant 5.0$, the astigmatism contributions of the object-side surface of the first lens and the image-side surface of the third lens can be effectively controlled, and the image quality in the central field-of-view aperture band of the optical imaging lens assembly can be reasonably and effectively controlled.

In an exemplary embodiment, the optical imaging lens assembly according to the present disclosure may satisfy: $3.2 \leqslant |(SAG51+SAG52)/CT5| \leqslant 5.5$, where CT5 is the center thickness of the fifth lens on the optical axis, SAG51 is the on-axis distance from an intersection of an object-side surface of the fifth lens and the optical axis to a vertex of an effective radius of the object-side surface of the fifth lens, and SAG52 is an on-axis distance from an intersection of an image-side surface of the fifth lens and the optical axis to a vertex of an effective radius of the image-side surface of the fifth lens. More specifically, SAG51, SAG52, and CT5 may further satisfy: $3.4 \leqslant (SAG51+SAG52)/CT5 \leqslant 5.5$. Satisfying $3.2 \leqslant (SAG51+SAG52)/CT5 5.5$ facilitates smooth surface transition of the fifth lens, and facilitates molding of the fifth lens, thereby enabling the fifth lens to meet processability and processability requirements.

In an exemplary embodiment, the optical imaging lens assembly according to the present disclosure may satisfy: $3.0 \leqslant |(R9+R10)/ET5| \leqslant 4.2$, where R9 is the radius of curvature of the object-side surface of the fifth lens, R10 is the radius of curvature of the image-side surface of the fifth lens, and ET5 is the edge thickness of the fifth lens. More specifically, R9, R10 and ET5 may further satisfy: $3.1 \leqslant |(R9+R10)/ET5| \leqslant 4.2$. By satisfying $3.0 \leqslant |(R9+R10)/ET5| \leqslant 4.2$, the fifth lens can meet the requirements of processability and processability, and it is advantageous to correct the field curvature and astigmatism of the optical imaging lens assembly, thereby improving the lens resolution capability.

In an exemplary embodiment, the optical imaging lens assembly according to the present disclosure may satisfy: $3.8 \leqslant f12/R3+f12/R4 \leqslant 4.8$, where R3 is the radius of curvature of the object-side surface of the second lens, R4 is the radius of curvature of the image-side surface of the second lens, and f12 is the combined focal length of the first lens and the second lens. More specifically, f12, R3 and R4 may further satisfy: $3.9 \leqslant f12/R3+f12/R4 \leqslant 4.8$. Satisfying $3.8 \leqslant f12/R3+f12/R4 \leqslant 4.8$ facilitates correction of the axial chromatic aberration of the optical imaging lens assembly, and is beneficial for enabling the optical imaging lens assembly to have characteristics such as a large aperture.

In an exemplary embodiment, the optical imaging lens assembly according to the present disclosure may satisfy: $4.0 \leqslant |R14/SAG71+R14/SAG72| \leqslant 8.0$, where R14 is the radius of curvature of the image-side surface of the seventh lens, SAG71 is an on-axis distance from an intersection of an object-side surface of the seventh lens and the optical axis to a vertex of an effective radius of the object-side surface of the seventh lens, and SAG72 is an on-axis distance SAG52 from an intersection of an image-side surface of the seventh lens and the optical axis to a vertex of an effective radius of the image-side surface of the seventh lens. More specifically, R14, SAG71 and SAG72 may further satisfy: $4.0 \leqslant |R14/SAG71+R14/SAG72| \leqslant 7.8$. Satisfying $4.0 \leqslant |R14/SAG71+R14/SAG72| \leqslant 8.0$ is beneficial for controlling the surface shape of the seventh lens so as not to unduly bend, and to satisfy the workability and process requirements thereof.

In an exemplary embodiment, the optical imaging lens assembly according to the present disclosure may satisfy: $|f4\times\tan(\text{Semi-FOV})|<6.0$ mm, where f4 is the effective focal length of the fourth lens and Semi-FOV is a half of the maximum field-of-view of the optical imaging lens assembly. More specifically, f4 and Semi-FOV may further satisfy: $f4\times\tan(\text{Semi-FOV})|<5.3$ mm. Satisfying $|f4\times\tan(\text{Semi-FOV})|<6.0$ mm is advantageous in obtaining a larger field of view, and in reducing the total effective focal length of the optical imaging lens assembly, so that the lens obtains an imaging effect of large field of view and small distortion.

In an exemplary embodiment, the optical imaging lens assembly according to the present disclosure may satisfy: $16 \text{ mm}^2 \leq TTL\times f/\tan(\text{Semi-FOV}) \leq 18 \text{ mm}^2$, where TTL is the distance from the object-side surface of the first lens to the imaging surface of the optical imaging lens assembly on the optical axis, f is the total effective focal length of the optical imaging lens assembly, and Semi-FOV is a half of the maximum field-of-view of the optical imaging lens assembly. Satisfying $16 \text{ mm}^2 \leq TTL\times f/\tan(\text{Semi-FOV}) \leq 18 \text{ mm}^2$, is beneficial in enabling the optical imaging lens assembly to have characteristics such as a large field of view and ultra-thinning, and ensuring the compact structure of the optical imaging lens assembly.

In an exemplary embodiment, the optical imaging lens assembly according to the present disclosure may satisfy $CT6/\Sigma CT \leq 0.3$, where CT6 is the center thickness of the sixth lens on the optical axis and $\Sigma CT$ is the sum of the center thicknesses of the first lens to the seventh lens on the optical axis. More specifically, CT6 and $\Sigma CT$ may further satisfy: $CT6/\Sigma CT \leq 0.28$. By satisfying $CT6/\Sigma CT \leq 0.3$, the optical imaging lens assembly can be adapted to correct the field curvature and distortion of the off-axis field of view of the optical imaging lens assembly while satisfying the requirements of processability and formability.

In an exemplary embodiment, the optical imaging lens assembly according to the present disclosure may satisfy: $1.8 \leq \Sigma CT/\Sigma AT \leq 3.0$, where $\Sigma CT$ is the sum of the center thicknesses of the first lens to the seventh lens on the optical axis, and $\Sigma AT$ is the sum of the spaced intervals of any two adjacent lenses of the first lens to the seventh lens on the optical axis. More specifically, $\Sigma CT$ and $\Sigma AT$ may further satisfy: $1.8 \leq \Sigma CT/\Sigma AT \leq 2.8$. Satisfying $1.8 \leq \Sigma CT/\Sigma AT \leq 3.0$ is beneficial for a compact structure of the optical imaging lens assemble, and satisfying the ultra-thin requirement.

In an exemplary embodiment, the optical imaging lens assembly according to the present disclosure further includes a stop disposed between the second lens and the third lens. Alternatively, the optical imaging lens assembly may further comprise a filter for correcting color deviations and/or a protective glass for protecting the photosensitive element located on the imaging surface. The present disclosure proposes an optical imaging lens assembly having characteristics of miniaturization, large aperture, ultra-thin and high imaging quality. The optical imaging lens assembly according to embodiments of the present disclosure may employ multiple lenses, such as seven lenses as described above. By properly configuring the refractive power of each lens, the surface shape, the center thickness of each lens, and spaced intervals along the optical axis between the lenses, the size and the sensitivity of the imaging lens assembly may be effectively reduced, and the workability of the imaging lens assembly may be improved, such that the optical imaging lens assembly is more advantageous for production processing and may be applied to portable electronic products. This present disclosure intends to provide a seven-piece optical imaging lens assembly with a large image plane, a large aperture, and an ultra-thin thickness, to better meet the application requirements of smart phones for the main camera. Large image plane means higher pixel and imaging resolution. Large aperture represents more effective luminous flux and a higher signal-to-noise ratio during imaging, which is conducive to the image quality of night scenes under dark light. Ultra-thinness may achieve better compatibility with the shape of the smart phones for easy portability.

In the embodiments of the present disclosure, at least one of the surfaces of the lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to include seven lenses. The optical imaging lens assembly may also include other numbers of lenses if desired.

Some specific examples of an optical imaging lens assembly applicable to the above embodiment will be further described below with reference to the accompanying drawings.

EXAMPLE 1

An optical imaging lens assembly according to example 1 of the present disclosure is described below with reference to FIGS. 1 to 2D. FIG. 1 shows a schematic structural diagram of an optical imaging lens assembly according to example 1 of the present disclosure.

As shown in FIG. 1, the optical imaging lens assembly includes a first lens E1, a second lens E2, a stop STO, a third lens E3, a fourth lens E4, a fifth lens E5, a sixth lens E6, a seventh lens E7, a filter E8, and an imaging surface S17 in sequence from the object side to the image side.

The first lens E1 has a negative refractive power, the object-side surface S1 of the first lens E1 is a concave surface, and the image-side surface S2 of the first lens is a convex surface. The second lens E2 has a positive refractive power, the object-side surface S3 of the second lens is convex, and the image-side surface S4 of the second lens is concave. The third lens E3 has a negative refractive power, and the object-side surface S5 of the third lens is concave, and the image-side surface S6 of the third lens is concave. The fourth lens E4 has a positive refractive power, the object-side surface S7 of the fourth lens is a convex surface, and the image-side surface S8 of the fourth lens is a convex surface. The fifth lens E5 has a negative refractive power, the object-side surface S9 of the fifth lens is a concave surface, and the image-side surface S10 of the fifth lens is a convex surface. The sixth lens E6 has a positive refractive power, and the object-side surface S11 of the sixth lens is a convex surface and the image-side surface S12 of the sixth lens is a convex surface. The seventh lens E7 has a negative refractive power, and the object-side surface S13 of the seventh lens is a convex surface and the image-side surface S14 of the seventh lens is a concave surface. The filter E8 has an object-side surface S15 and an image-side surface S16. Light from the object sequentially passes through the surfaces S1 to S16 and is finally imaged on the imaging surface S517.

Table 1 shows a basic parameter table of the optical imaging lens assembly of example 1, where the radius of curvature, the thickness/distance, and the focal length are all in units of millimeters (mm).

TABLE 1

| surface number | Surface type | Radius of curvature | Thickness/ distance | Material Refractive index | Abbe number | Focal length | Conical coefficient |
|---|---|---|---|---|---|---|---|
| OBJ | Spherical surface | Infinite | Infinite | | | | |
| S1 | Aspheric surface | −3.7863 | 0.5065 | 1.55 | 56.1 | −18.08 | −1.3868 |
| S2 | Aspheric surface | −6.4326 | 0.1110 | | | | −35.4945 |
| S3 | Aspheric surface | 2.1493 | 0.5803 | 1.55 | 56.1 | 5.61 | 0.5688 |
| S4 | Aspheric surface | 6.5321 | 0.0722 | | | | −88.4003 |
| STO | Spherical surface | Infinite | 0.3832 | | | | |
| S5 | Aspheric surface | −83.5922 | 0.2400 | 1.67 | 19.2 | −14.66 | 0.0000 |
| S6 | Aspheric surface | 11.2718 | 0.0301 | | | | 0.0000 |
| S7 | Aspheric surface | 12.5671 | 0.6782 | 1.55 | 56.1 | 3.57 | 0.0000 |
| S8 | Aspheric surface | −2.2598 | 0.6792 | | | | 0.0000 |
| S9 | Aspheric surface | −0.6299 | 0.2999 | 1.67 | 19.2 | −4.28 | −1.0000 |
| S10 | Aspheric surface | −0.9595 | 0.0300 | | | | −1.0000 |
| S11 | Aspheric surface | 1.8730 | 0.7666 | 1.55 | 56.1 | 3.28 | −0.9838 |
| S12 | Aspheric surface | −35.1225 | 0.4945 | | | | 0.0000 |
| S13 | Aspheric surface | 39.7523 | 0.3502 | 1.55 | 56.1 | −4.91 | 0.0000 |
| S14 | Aspheric surface | 2.5046 | 0.2981 | | | | −1.0000 |
| S15 | Spherical surface | Infinite | 0.2100 | 1.52 | 64.2 | | |

TABLE 1-continued

| surface number | Surface type | Radius of curvature | Thickness/ distance | Material Refractive index | Abbe number | Focal length | Conical coefficient |
|---|---|---|---|---|---|---|---|
| S16 | Spherical surface | Infinite | 0.6200 | | | | |
| S17 | Spherical surface | Infinite | | | | | |

In this example, the total effective focal length f of the optical imaging lens assembly is 3.59 mm, the total length TTL of the optical imaging lens assembly (that is, the distance on the optical axis from the object-side surface S1 of the first lens E1 to the imaging surface S17 of the optical imaging lens assembly) is 6.35 mm, a half ImgH of the diagonal length of the effective pixel area on the imaging surface S17 of the optical imaging lens assembly is 4.74 mm, a half Semi-FOV of the maximum field-of-view Semi-FOV of the optical imaging lens assembly is 52.82°, and an aperture value Fno of the optical imaging lens assembly is 1.95.

In example 1, the object-side surface and the image-side surface of any one of the first lenses E1 to the seventh lens E7 are aspherical, and the surface shape X of each aspherical lens may be defined by using, but is not limited to, the following aspheric formula:

$$x = \frac{ch^2}{1 + \sqrt{1 - (k+1)c^2 h^2}} + \Sigma A_i h^i \quad (1)$$

where X is the sag-axis-component of the displacement of the surface from the aspheric vertex, when the aspherical surface is at height h from the optical axis; c is the paraxial curvature of the aspheric surface, c=1/R (i.e., the paraxial curvature c is the reciprocal of the radius R of curvature in Table 1 above); k is a conical coefficient: Ai is the correction coefficient of the ith order of the aspheric surface. The high-order term coefficients A4, A6, A8, A10, A12, A14, A16, A18, A20, A22, A24, A26, A28 and A30 that applicable to each aspheric surface S1-S14 in example 1 are given in Tables 2-1 and 2-2 below.

TABLE 2-1

| surface number | A4 | A6 | A8 | A10 | A12 | A14 | A16 |
|---|---|---|---|---|---|---|---|
| S1 | 6.0408E−01 | −6.1330E−02 | 1.7057E−02 | −4.2838E−03 | 5.6828E−04 | −7.7112E−04 | −2.2971E−04 |
| S2 | 4.1041E−01 | −1.1657E−02 | 2.0438E−02 | −2.1173E−03 | −8.2476E−05 | −2.2914E−03 | −1.3344E−03 |
| S3 | 9.9300E−02 | −7.3889E−03 | 5.0630E−03 | −2.3496E−03 | −4.3927E−04 | −7.4797E−04 | −2.4402E−04 |
| S4 | 1.3897E−02 | −1.3994E−02 | 9.7422E−04 | 1.8907E−03 | 8.5537E−04 | −2.3010E−04 | −4.4237E−04 |
| S5 | −1.4020E−01 | −1.5601E−02 | −1.3496E−03 | 1.2190E−03 | 7.6961E−04 | 3.6930E−04 | 1.1014E−04 |
| S6 | −1.7677E−01 | 1.5483E−02 | 2.0736E−03 | 3.3577E−03 | 1.7270E−03 | 6.0466E−04 | 5.2353E−05 |
| S7 | −9.9112E−02 | 2.8224E−02 | −5.1036E−03 | −1.0226E−03 | 4.1023E−04 | 2.0331E−04 | 4.7265E−05 |
| S8 | −7.4001E−02 | 8.2558E−03 | −3.3048E−03 | −7.4218E−03 | −2.5585E−03 | 1.8461E−04 | 8.7550E−04 |
| S9 | 9.5672E−01 | −1.2757E−01 | 1.8263E−02 | −2.9351E−02 | 2.8622E−03 | −4.0381E−03 | 5.2143E−04 |
| S10 | 1.1146E+00 | −4.9933E−02 | 1.0797E−02 | −2.1161E−02 | 1.2301E−02 | −1.9124E−03 | 1.4684E−03 |
| S11 | −3.0480E+00 | 4.2382E−01 | 2.4979E−03 | 7.6508E−03 | −3.5306E−02 | 2.4807E−02 | 7.5487E−03 |
| S12 | −2.4505E−01 | −2.9122E−01 | 2.4464E−01 | −8.4812E−02 | 8.5280E−02 | 4.6879E−02 | 3.8810E−02 |
| S13 | −1.1264E+00 | 7.1639E−01 | −2.3563E−01 | 5.0050E−02 | −1.0129E−02 | −6.2679E−02 | 1.5521E−02 |
| S14 | −5.4882E+00 | 1.0543E+00 | −2.0411E−01 | 3.1330E−02 | −4.1559E−02 | −2.5417E−02 | −6.4154E−03 |

TABLE 2-2

| surface number | A18 | A20 | A22 | A24 | A26 | A28 | A30 |
|---|---|---|---|---|---|---|---|
| S1 | −2.0924E−04 | −1.1552E−04 | −4.2460E−05 | −1.7387E−05 | 0.0000E+00 | 0.0000E+00 | 0.0000E+00 |
| S2 | −1.0181E−03 | −4.6755E−04 | −1.9526E−04 | −4.3718E−05 | 0.0000E+00 | 0.0000E+00 | 0.0000E+00 |
| S3 | −1.2450E−04 | −2.1023E−05 | 0.0000E+00 | 0.0000E+00 | 0.0000E+00 | 0.0000E+00 | 0.0000E+00 |
| S4 | −2.4682E−04 | −5.6560E−05 | 0.0000E+00 | 0.0000E+00 | 0.0000E+00 | 0.0000E+00 | 0.0000E+00 |
| S5 | 9.2945E−06 | −1.5378E−05 | 1.1653E−06 | 7.5928E−07 | 0.0000E+00 | 0.0000E+00 | 0.0000E+00 |
| S6 | −9.3389E−05 | −1.1563E−04 | −1.4098E−05 | −1.1211E−05 | 0.0000E+00 | 0.0000E+00 | 0.0000E+00 |
| S7 | −1.5686E−05 | −6.8361E−05 | 8.5142E−06 | −2.1731E−05 | −6.6559E−06 | 0.0000E+00 | 0.0000E+00 |
| S8 | 4.7826E−04 | 5.0341E−05 | −1.0703E−04 | −6.5602E−05 | −2.2385E−05 | 0.0000E+00 | 0.0000E+00 |
| S9 | −7.6670E−05 | 3.5217E−04 | 1.7807E−05 | 1.2665E−04 | 2.6279E−05 | 0.0000E+00 | 0.0000E+00 |
| S10 | −2.2401E−04 | −1.7844E−04 | −3.7287E−04 | 5.4268E−05 | −9.7477E−05 | 0.0000E+00 | 0.0000E+00 |
| S11 | 7.1987E−03 | −1.4927E−03 | 4.5807E−03 | 3.1274E−03 | 5.7353E−03 | 4.1195E−03 | 1.4941E−03 |
| S12 | 1.9858E−03 | −1.8871E−02 | −6.6404E−03 | −2.4127E−03 | 7.4044E−03 | 2.0653E−03 | 1.1571E−04 |
| S13 | 9.8516E−03 | 4.9165E−02 | 1.2461E−02 | −1.6413E−02 | −7.5871E−03 | −1.5035E−02 | −1.0755E−02 |
| S14 | −2.4047E−02 | −8.9933E−03 | 1.6186E−02 | 1.4070E−02 | −7.0102E−03 | −1.4560E−02 | −7.4394E−03 |

Figure 2D:
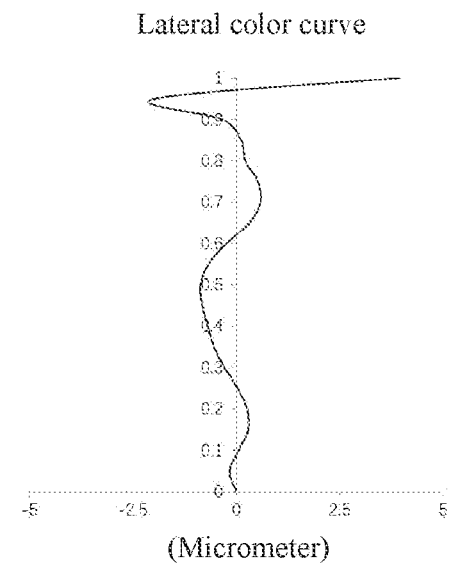

FIG. 2A shows the longitudinal aberration curves of the optical imaging lens assembly of example 1, representing the deviation of the convergence focus of lights of different wavelengths passing through the lens assembly. FIG. 2B shows astigmatic curves of the optical imaging lens assembly of example 1, representing the curvatures of a tangential plane and the curvatures of a sagittal plane. FIG. 2C shows a distortion curve of the optical imaging lens assembly of example 1, representing the amounts of distortion corresponding to different image heights. FIG. 2D shows a lateral color curve of the optical imaging lens assembly of example 1, representing the deviation of different heights of images on the imaging plane formed by light passing through the optical imaging lens assembly. As can be seen from FIGS. 2A to 2D, the optical imaging lens assembly according to example 1 can achieve good imaging quality.

EXAMPLE 2

Figure 3:
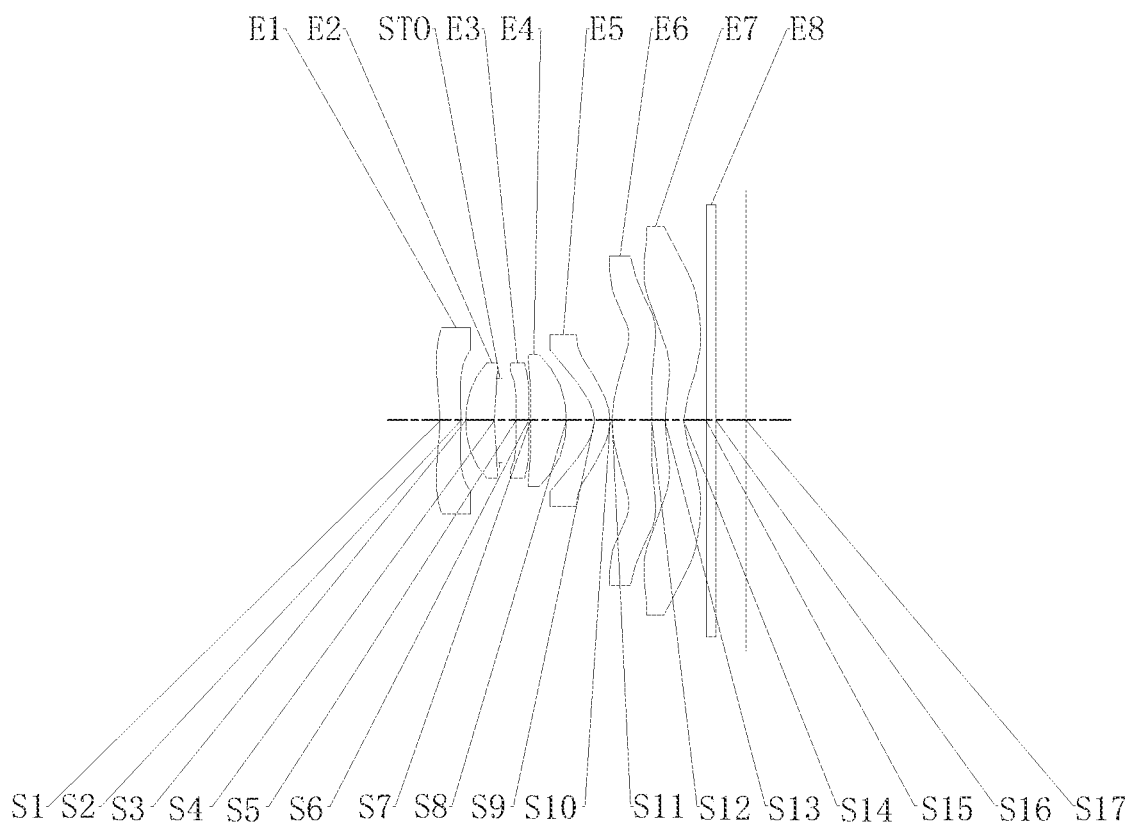
FIG. 3 is a schematic structural diagram of an optical imaging lens assembly according to example 2 of the present disclosure.

An optical imaging lens assembly according to example 2 of the present disclosure is described below with reference to FIGS. 3 to 4D. In this example and the following examples, a description of parts similar to example 1 will be omitted for brevity. FIG. 3 shows a schematic structural diagram of an optical imaging lens assembly according to example 2 of the present disclosure.

As shown in FIG. 3, the optical imaging lens assembly includes a first lens E1, a second lens E2, a stop STO, a third lens E3, a fourth lens E4, a fifth lens E5, a sixth lens E6, a seventh lens E7, a filter E8, and an imaging surface S17 in sequence from the object side to the image side.

The first lens E1 has a negative refractive power, an object-side surface S1 of the first lens is a concave surface, and an image-side surface S2 of the first lens is a convex surface. The second lens E2 has a positive refractive power, the object-side surface S3 of the second lens is convex, and the image-side surface S4 of the second lens is concave. The third lens E3 has a negative refractive power, and the object-side surface S5 of the third lens is a convex surface and the image-side surface S6 of the third lens is a concave surface. The fourth lens E4 has a positive refractive power, the object-side surface S7 of the fourth lens is a convex surface, and the image-side surface S8 of the fourth lens is a convex surface. The fifth lens E5 has a negative refractive power, the object-side surface S9 of the fifth lens is a concave surface, and the image-side surface S10 of the fifth lens is a convex surface. The sixth lens E6 has a positive refractive power, and the object-side surface S11 of the sixth lens is a convex surface and the image-side surface S12 of the sixth lens is a concave surface. The seventh lens E7 has a negative refractive power, and the object-side surface S13 of the seventh lens is a convex surface and the image-side surface S14 of the seventh lens is a concave surface. The filter E8 has an object-side surface S15 and an image-side surface S16. Light from the object sequentially passes through the surfaces S1 to S16 and is finally imaged on the imaging surface S17.

In this example, the total effective focal length f of the optical imaging lens assembly is 3.53 mm, the total length TTL of the optical imaging lens assembly is 6.33 mm, a half ImgH of the diagonal length of the effective pixel area on the imaging surface S17 of the optical imaging lens assembly is 4.74 mm, a half Semi-FOV of the maximum field-of-view of the optical imaging lens assembly is 52.17°, and an aperture value Fno of the optical imaging lens assembly is 1.97.

Table 3 is a table showing basic parameters of the optical imaging lens assembly of example 2, where the units of radius of curvature, the thickness/distance, and the focal length are millimeters (mm). Tables 4-1, 4-2 show the high-order term coefficients that applicable to each aspheric surface in example 2, where the surface shape of each aspheric surface may be defined by formula (1) given in example 1 above.

TABLE 3

| surface number | Surface type | Radius of curvature | Thickness/ distance | Material Refractive index | Material Abbe number | Focal length | Conical coefficient |
|---|---|---|---|---|---|---|---|
| OBJ | Spherical surface | Infinite | Infinite | | | | |
| S1 | Aspheric surface | −3.3528 | 0.4277 | 1.55 | 56.1 | −49.3 | 0.0000 |
| S2 | Aspheric surface | −4.0021 | 0.0997 | | | | 0.0000 |
| S3 | Aspheric surface | 2.4565 | 0.5923 | 1.55 | 56.1 | 6.56 | 0.0000 |
| S4 | Aspheric surface | 7.1608 | 0.0988 | | | | 0.0000 |
| STO | Spherical surface | Infinite | 0.3506 | | | | |
| S5 | Aspheric surface | 257.6998 | 0.2589 | 1.67 | 19.2 | −11.84 | 0.0000 |
| S6 | Aspheric surface | 7.7731 | 0.0437 | | | | 0.0000 |
| S7 | Aspheric surface | 8.9612 | 0.7403 | 1.55 | 56.1 | 3.47 | 0.0000 |
| S8 | Aspheric surface | −2.3331 | 0.5814 | | | | 0.0000 |
| S9 | Aspheric surface | −0.6550 | 0.3231 | 1.67 | 19.2 | −5.67 | −1.0000 |
| S10 | Aspheric surface | −0.9470 | 0.0400 | | | | −1.0000 |
| S11 | Aspheric surface | 2.3225 | 0.8186 | 1.55 | 56.1 | 4.61 | −1.0000 |
| S12 | Aspheric surface | 26.0631 | 0.2741 | | | | 0.0000 |

TABLE 3-continued

| surface number | Surface type | Radius of curvature | Thickness/ distance | Material Refractive index | Abbe number | Focal length | Conical coefficient |
|---|---|---|---|---|---|---|---|
| S13 | Aspheric surface | 2.0349 | 0.3900 | 1.55 | 56.1 | −7.63 | −1.0000 |
| S14 | Aspheric surface | 1.2747 | 0.4629 | | | | −1.0000 |
| S15 | Spherical surface | Infinite | 0.2100 | 1.52 | 64.2 | | |
| S16 | Spherical surface | Infinite | 0.6219 | | | | |
| S17 | Spherical surface | Infinite | | | | | |

TABLE 4-1

| surface number | A4 | A6 | A8 | A10 | A12 | A14 | A16 |
|---|---|---|---|---|---|---|---|
| S1 | 6.6329E−01 | −6.8015E−02 | 1.7347E−02 | −5.0593E−03 | 1.0089E−03 | −4.8334E−04 | 4.7407E−05 |
| S2 | 4.7882E−01 | −4.2945E−02 | 1.8350E−02 | −5.4772E−03 | 1.1165E−03 | −1.1666E−03 | 3.5983E−05 |
| S3 | 1.2570E−01 | −1.0682E−02 | 6.5176E−03 | −2.1793E−03 | 1.5302E−04 | −5.1325E−04 | −9.9876E−05 |
| S4 | −6.7752E−03 | 5.9572E−04 | −1.4824E−04 | −6.8324E−05 | −5.2152E−05 | −2.0955E−05 | −5.4311E−06 |
| S5 | −9.3901E−02 | −8.3245E−03 | −2.7870E−03 | −7.6327E−05 | −6.2856E−06 | 1.0936E−04 | 3.5933E−05 |
| S6 | −1.7396E−01 | 1.4873E−02 | −5.4938E−03 | 4.0324E−04 | 1.9152E−04 | 4.9109E−04 | 1.1310E−04 |
| S7 | −1.5951E−01 | 3.2057E−02 | −4.0556E−03 | −1.9967E−04 | 1.2395E−04 | 4.7826E−04 | 7.5782E−05 |
| S8 | −1.2549E−01 | 3.4601E−03 | 6.5216E−03 | 4.0285E−04 | −2.1376E−04 | −4.5835E−04 | −1.1709E−04 |
| S9 | 7.7264E−01 | −8.9524E−02 | 2.9223E−02 | −1.8465E−02 | 3.3551E−03 | −1.9933E−03 | −1.1367E−04 |
| S10 | 9.8610E−01 | −5.7805E−02 | 3.3406E−02 | −2.6602E−02 | 8.4302E−03 | −2.0006E−03 | 4.0030E−04 |
| S11 | −2.4346E+00 | 3.4240E−01 | 8.1338E−02 | −4.8030E−02 | −2.2872E−02 | 1.8979E−02 | 9.5060E−04 |
| S12 | −7.4884E−01 | 1.8687E−02 | 1.4503E−01 | −6.6395E−02 | −2.5885E−02 | 2.6804E−02 | −2.8831E−03 |
| S13 | −5.1026E+00 | 1.6110E+00 | −5.8725E−01 | 1.9270E−01 | −7.6983E−02 | 4.0138E−02 | −1.0821E−02 |
| S14 | −8.0614E+00 | 1.7747E+00 | −5.4027E−01 | 2.3483E−01 | −1.0998E−01 | 2.2319E−02 | −7.7303E−03 |

TABLE 4-2

| surface number | A18 | A20 | A22 | A24 | A26 | A28 | A30 |
|---|---|---|---|---|---|---|---|
| S1 | −2.4637E−05 | 2.9142E−07 | 2.4044E−06 | −9.7392E−06 | 0.0000E+00 | 0.0000E+00 | 0.0000E+00 |
| S2 | −1.8841E−04 | 4.5481E−05 | 8.0250E−06 | 1.5723E−05 | 0.0000E+00 | 0.0000E+00 | 0.0000E+00 |
| S3 | −1.0376E−04 | −1.5362E−05 | 0.0000E+00 | 0.0000E+00 | 0.0000E+00 | 0.0000E+00 | 0.0000E+00 |
| S4 | 2.0419E−06 | −8.6330E−07 | 0.0000E+00 | 0.0000E+00 | 0.0000E+00 | 0.0000E+00 | 0.0000E+00 |
| S5 | 1.9171E−05 | −3.6661E−06 | −5.7361E−07 | 0.0000E+00 | 0.0000E+00 | 0.0000E+00 | 0.0000E+00 |
| S6 | 3.3252E−05 | −3.9024E−05 | −1.7452E−05 | 1.4738E−06 | 0.0000E+00 | 0.0000E+00 | 0.0000E+00 |
| S7 | 5.6973E−07 | −6.6166E−05 | −1.5241E−05 | 8.0557E−06 | 1.5828E−06 | 0.0000E+00 | 0.0000E+00 |
| S8 | 1.0693E−04 | 1.3014E−04 | 3.6507E−05 | 3.6298E−06 | −1.5426E−05 | 0.0000E+00 | 0.0000E+00 |
| S9 | 3.3278E−05 | 4.4366E−05 | −8.6818E−05 | −2.9551E−06 | −1.8259E−07 | 6.4768E−06 | 0.0000E+00 |
| S10 | 3.7987E−04 | −1.7023E−04 | −9.0325E−05 | 5.1295E−05 | −2.4538E−06 | 0.0000E+00 | 0.0000E+00 |
| S11 | −3.0460E−03 | −8.7287E−04 | 2.5085E−03 | −1.4711E−03 | 7.8947E−05 | 2.5840E−05 | 4.5243E−05 |
| S12 | 1.7691E−03 | −1.1447E−02 | 1.1076E−02 | −3.4770E−03 | 1.9017E−03 | −1.9254E−03 | 4.8577E−04 |
| S13 | −5.5523E−03 | 1.1227E−03 | 8.8973E−03 | −1.1546E−02 | 7.1015E−03 | −1.9044E−03 | 9.5035E−05 |
| S14 | 1.4470E−02 | −6.2984E−03 | 2.1238E−03 | −4.9307E−03 | 1.8990E−03 | −1.4794E−03 | 1.4008E−03 |

Figure 4A:
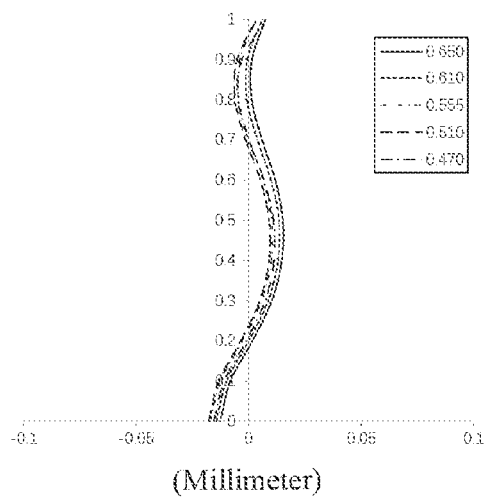
FIGS. 4A to 4D show longitudinal aberration curves, astigmatic curves, a distortion curve, and a lateral color curve of the optical imaging lens assembly of example 2 respectively.
Figure 4B:
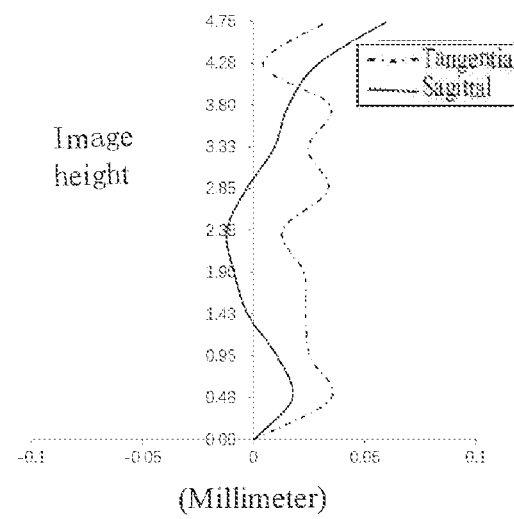
Figure 4C:
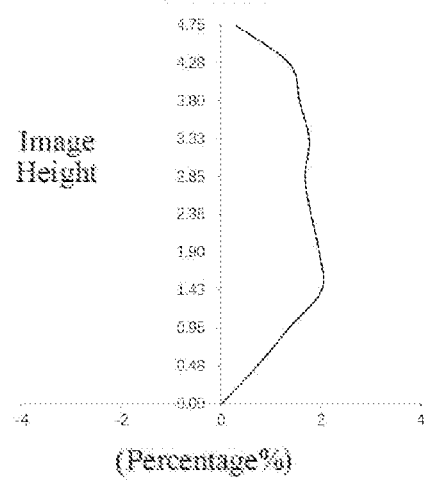
Figure 4D:
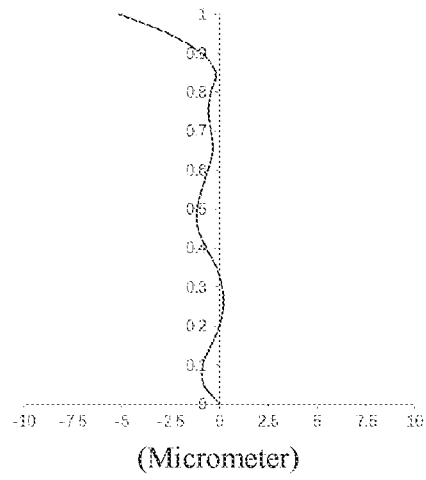

FIG. 4a shows longitudinal aberration curves of the optical imaging lens assembly of example 2, representing the deviation of the convergence focus of lights of different wavelengths passing through the lens assembly. FIG. 4B shows astigmatic curves of the optical imaging lens assembly of example 2, representing the curvatures of a tangential plane and the curvatures of a sagittal plane. FIG. 4C shows a distortion curve of the optical imaging lens assembly of example 2, representing the amounts of distortion corresponding to different image heights. FIG. 4D shows a lateral color curve of the optical imaging lens assembly of example 2, representing the deviation of different heights of images on the imaging plane formed by light passing through the optical imaging lens assembly. As can be seen from FIGS. 4a to 4D, the optical imaging lens assembly according to example 2 can achieve good imaging quality.

EXAMPLE 3

Figure 5:
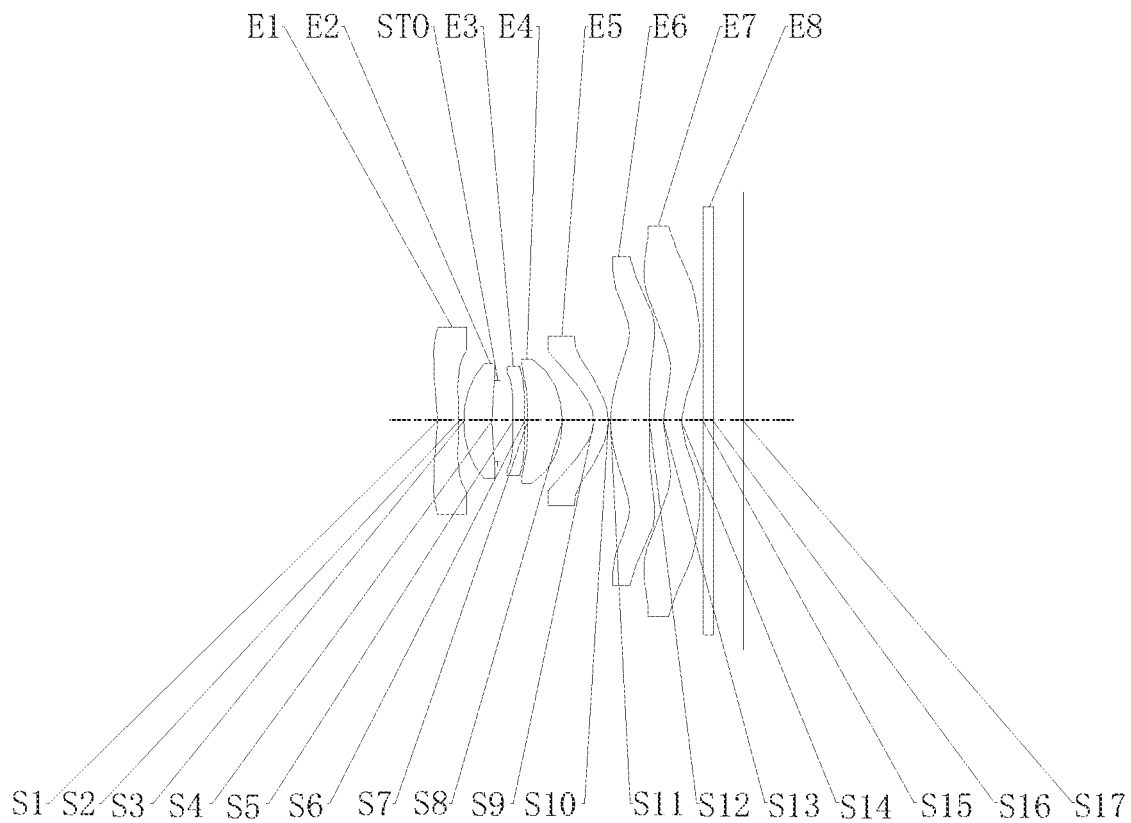
FIG. 5 is a schematic structural diagram of an optical imaging lens assembly according to example 3 of the present disclosure.

An optical imaging lens assembly according to example 3 of the present disclosure is described below with reference to FIGS. 5 to 6D. FIG. 5 shows a schematic structural diagram of an optical imaging lens assembly according to example 3 of the present disclosure.

As shown in FIG. 5, the optical imaging lens assembly includes a first lens E1, a second lens E2, a stop STO, a third lens E3, a fourth lens E4, a fifth lens E5, a sixth lens E6, a seventh lens E7, a filter E8, and an imaging surface S17 in sequence from the object side to the image side.

The first lens E1 has a negative refractive power, an object-side surface S1 of the first lens is a concave surface, and an image-side surface S2 of the first lens is a convex surface. The second lens E2 has a positive refractive power, the object-side surface S3 of the second lens is convex, and the image-side surface S4 of the second lens is concave. The third lens E3 has a negative refractive power, and the object-side surface S5 thereof is concave, and image-side surface S6 thereof is concave. The fourth lens E4 has a positive refractive power, the object-side surface S7 thereof is a concave surface, and the image-side surface S8 thereof is a convex surface. The fifth lens E5 has a negative refractive power, the object-side surface S9 thereof is a concave surface, and the image-side surface S10 thereof is a convex surface. The sixth lens E6 has a positive refractive power, the object-side surface S11 thereof is a convex surface and the image-side surface S12 thereof is a concave surface. The seventh lens E7 has a negative refractive power, the object-side surface S13 thereof is a convex surface and the image-side surface S14 thereof is a concave surface. The filter E8 has an object-side surface S15 and an image-side surface S16. Light from the object sequentially passes through the respective surfaces S1 to S16 and is finally imaged on the imaging surface S17.

In this example, the total effective focal length f of the optical imaging lens assembly is 3.53 mm, the total length TTL of the optical imaging lens assembly is 6.33 mm, a half ImgH of the diagonal length of the effective pixel area on the imaging surface S17 of the optical imaging lens assembly is 4.74 mm, a half Semi-FOV of the maximum field-of-view of the optical imaging lens assembly is 52.17°, and an aperture value Fno of the optical imaging lens assembly is 1.97.

Table 5 is a table showing basic parameters of the optical imaging lens assembly of example 3, where the units of radius of curvature, the thickness/distance, and the focal length are millimeters (mm). Tables 6-1, 6-2 show the high-order term coefficients that applicable to each aspheric surface in example 3, where the surface shape of each aspheric surface may be defined by formula (1) given in example 1 above.

TABLE 5

| surface number | Surface type | Radius of curvature | Thickness/ distance | Material Refractive Index | Abbe number | Focal length | Conical coefficient |
|---|---|---|---|---|---|---|---|
| OBJ | Spherical surface | Infinite | Infinite | | | | |
| S1 | Aspheric surface | −3.4531 | 0.4362 | 1.55 | 56.1 | −39.85 | 0.0000 |
| S2 | Aspheric surface | −4.2876 | 0.1025 | | | | 0.0000 |
| S3 | Aspheric surface | 2.4156 | 0.5815 | 1.55 | 56.1 | 6.41 | 0.0000 |
| S4 | Aspheric surface | 7.1262 | 0.0990 | | | | 0.0000 |
| STO | Spherical surface | Infinite | 0.3414 | | | | |
| S5 | Aspheric surface | −51.4831 | 0.2400 | 1.67 | 19.2 | −29.38 | 0.0000 |
| S6 | Aspheric surface | 32.4618 | 0.0650 | | | | 0.0000 |
| S7 | Aspheric surface | −36.5296 | 0.7167 | 1.55 | 56.1 | 3.91 | 99.0000 |
| S8 | Aspheric surface | −2.0323 | 0.6548 | | | | 0.0000 |
| S9 | Aspheric surface | −0.6314 | 0.2999 | 1.67 | 19.2 | −4.14 | −1.0000 |
| S10 | Aspheric surface | −0.9715 | 0.0400 | | | | −1.0000 |
| S11 | Aspheric surface | 2.2367 | 0.8088 | 1.55 | 56.1 | 4.23 | −1.0000 |
| S12 | Aspheric surface | 63.7714 | 0.2872 | | | | 0.0000 |
| S13 | Aspheric surface | 1.4633 | 0.3700 | 1.55 | 56.1 | −10.52 | −1.0000 |
| S14 | Aspheric surface | 1.0620 | 0.4516 | | | | −1.0000 |
| S15 | Spherical surface | Infinite | 0.2100 | 1.52 | 64.2 | | |
| S16 | Spherical surface | Infinite | 0.6294 | | | | |
| S17 | Spherical surface | Infinite | | | | | |

TABLE 6-1

| surface number | A4 | A6 | A8 | A10 | A12 | A14 | A16 |
|---|---|---|---|---|---|---|---|
| S1 | 6.3827E−01 | −6.1860E−02 | 1.5490E−02 | −4.6197E−03 | 8.7374E−04 | −4.0920E−04 | 4.4249E−05 |
| S2 | 4.4509E−01 | −3.5246E−02 | 1.6110E−02 | −4.9608E−03 | 8.3248E−04 | −1.0386E−03 | 3.8572E−05 |
| S3 | 1.0628E−01 | −5.7878E−03 | 5.7101E−03 | −1.8690E−03 | −5.3601E−05 | −5.0871E−04 | −1.4119E−04 |
| S4 | −7.3587E−03 | 9.1549E−04 | −1.3376E−04 | −1.0662E−04 | −7.6423E−05 | −2.5742E−05 | −4.0144E−06 |
| S5 | −9.3218E−02 | −8.7038E−03 | −2.9560E−03 | −4.7530E−04 | −5.2018E−05 | 6.2493E−05 | 3.7523E−05 |
| S6 | −1.4674E−01 | 7.3017E−03 | −3.5327E−03 | 2.2973E−05 | 6.2182E−04 | 3.1068E−04 | 1.0875E−04 |
| S7 | −1.5639E−01 | 2.3295E−02 | −3.2150E−04 | −8.9739E−04 | −2.6416E−06 | 7.6511E−05 | 2.3666E−04 |
| S8 | −2.2991E−01 | −2.1971E−02 | 4.6856E−03 | 1.1262E−03 | −5.3568E−04 | −7.9234E−04 | −9.5388E−05 |
| S9 | 7.9989E−01 | −9.7190E−02 | 3.3019E−02 | −2.1656E−02 | 2.9758E−03 | −2.2172E−03 | 6.1853E−05 |
| S10 | 9.5187E−01 | −5.1230E−02 | 3.4968E−02 | −3.0004E−02 | 9.2698E−03 | −1.8175E−03 | 6.7938E−04 |
| S11 | −2.5934E+00 | 3.5610E−01 | 6.6077E−02 | −3.5814E−02 | −1.9395E−02 | 1.6529E−02 | −3.4971E−03 |
| S12 | −5.2712E−01 | −8.1156E−02 | 1.7600E−01 | −7.1960E−02 | −2.0523E−02 | 2.7175E−02 | −2.8196E−03 |
| S13 | −6.8606E+00 | 2.0875E+00 | −7.5916E−01 | 2.6399E−01 | −1.1306E−01 | 5.8165E−02 | −1.8106E−02 |
| S14 | −9.5450E+00 | 2.2339E+00 | −7.1004E−01 | 3.1199E−01 | −1.4437E−01 | 3.8118E−02 | −1.8289E−02 |

TABLE 6-2

| surface number | A18 | A20 | A22 | A24 | A26 | A28 | A30 |
|---|---|---|---|---|---|---|---|
| S1 | −2.4038E−05 | −3.2248E−07 | 2.6849E−06 | −1.0365E−05 | 0.0000E+00 | 0.0000E+00 | 0.0000E+00 |
| S2 | −1.5263E−04 | 4.7078E−05 | 9.3324E−06 | 1.3526E−05 | 0.0000E+00 | 0.0000E+00 | 0.0000E+00 |
| S3 | −1.0487E−04 | −2.1764E−05 | 0.0000E+00 | 0.0000E+00 | 0.0000E+00 | 0.0000E+00 | 0.0000E+00 |
| S4 | 5.1802E−06 | 6.6803E−07 | 0.0000E+00 | 0.0000E+00 | 0.0000E+00 | 0.0000E+00 | 0.0000E+00 |
| S5 | 2.3726E−05 | 4.2313E−06 | 4.3311E−06 | 0.0000E+00 | 0.0000E+00 | 0.0000E+00 | 0.0000E+00 |
| S6 | −2.0678E−05 | −3.6557E−05 | −1.8401E−05 | 2.6256E−06 | 0.0000E+00 | 0.0000E+00 | 0.0000E+00 |
| S7 | 2.0872E−04 | 2.4636E−04 | 2.3634E−04 | 1.3772E−04 | 3.7060E−05 | 0.0000E+00 | 0.0000E+00 |
| S8 | 2.2968E−04 | 2.0034E−04 | 5.0827E−05 | −2.4915E−06 | −2.0872E−05 | 0.0000E+00 | 0.0000E+00 |
| S9 | −2.2488E−04 | −2.9273E−05 | −3.5909E−05 | 2.1541E−05 | 1.8824E−05 | 1.4307E−05 | 0.0000E+00 |
| S10 | −5.4214E−05 | −1.2142E−04 | 2.9960E−05 | 1.9289E−05 | −2.9127E−07 | 0.0000E+00 | 0.0000E+00 |
| S11 | −1.3784E−03 | 9.4847E−04 | 1.7306E−03 | −2.0389E−03 | 3.3864E−04 | 7.0853E−05 | 2.0548E−04 |
| S12 | −4.0585E−04 | −1.0022E−02 | 1.0468E−02 | −2.4764E−03 | 1.7604E−03 | −2.3053E−03 | 6.4034E−04 |
| S13 | −3.5824E−03 | −8.0699E−04 | 1.0490E−02 | −1.2539E−02 | 6.7256E−03 | −1.0096E−03 | −1.5457E−04 |
| S14 | 2.1698E−02 | −1.0183E−02 | 5.2227E−03 | −6.2204E−03 | 1.5601E−03 | −1.7682E−03 | 1.5111E−03 |

Figure 6A:
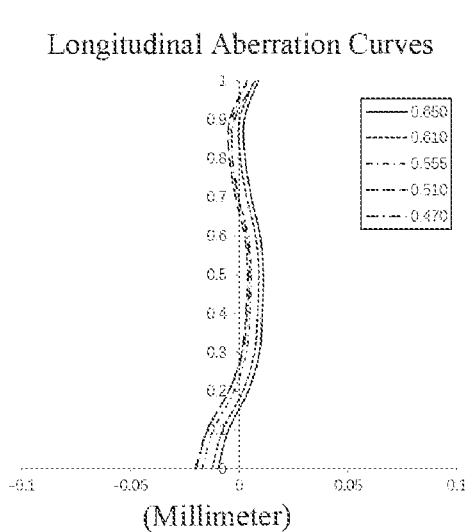
FIGS. 6A to 6D show longitudinal aberration curves, astigmatic curves, a distortion curve, and a lateral color curve of the optical imaging lens assembly of example 3 respectively.
Figure 6B:
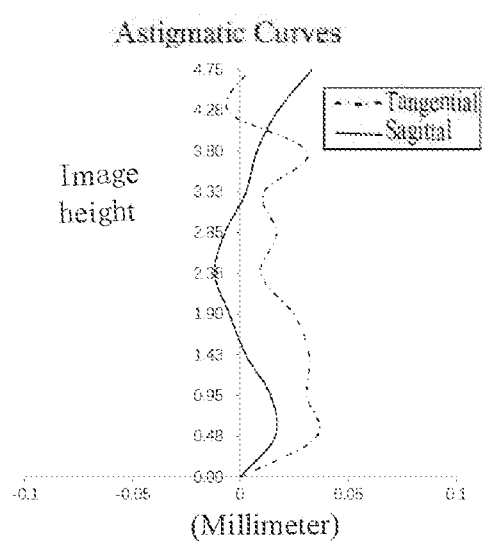
Figure 6C:
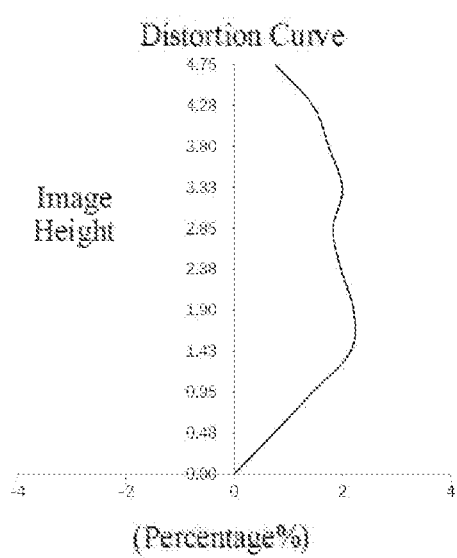
Figure 6D:
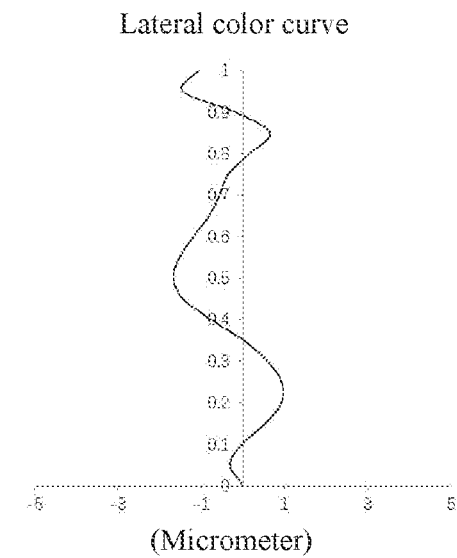

FIG. 6a shows longitudinal aberration curves of the optical imaging lens assembly of example 3, representing the deviation of the convergence focus of lights of different wavelengths passing through the lens assembly. FIG. 6B shows astigmatic curves of the optical imaging lens assembly of example 3, representing the curvatures of a tangential plane and the curvatures of a sagittal plane. FIG. 6C shows a distortion curve of the optical imaging lens assembly of example 3, representing the amounts of distortion corresponding to different image heights. FIG. 6D shows a lateral color curve of the optical imaging lens assembly of example 3 representing the deviation of different heights of images on the imaging plane formed by light passing through the optical imaging lens assembly. As can be seen from FIGS. 6a to 6D, the optical imaging lens assembly according to example 3 can achieve good imaging quality.

EXAMPLE 4

Figure 7:
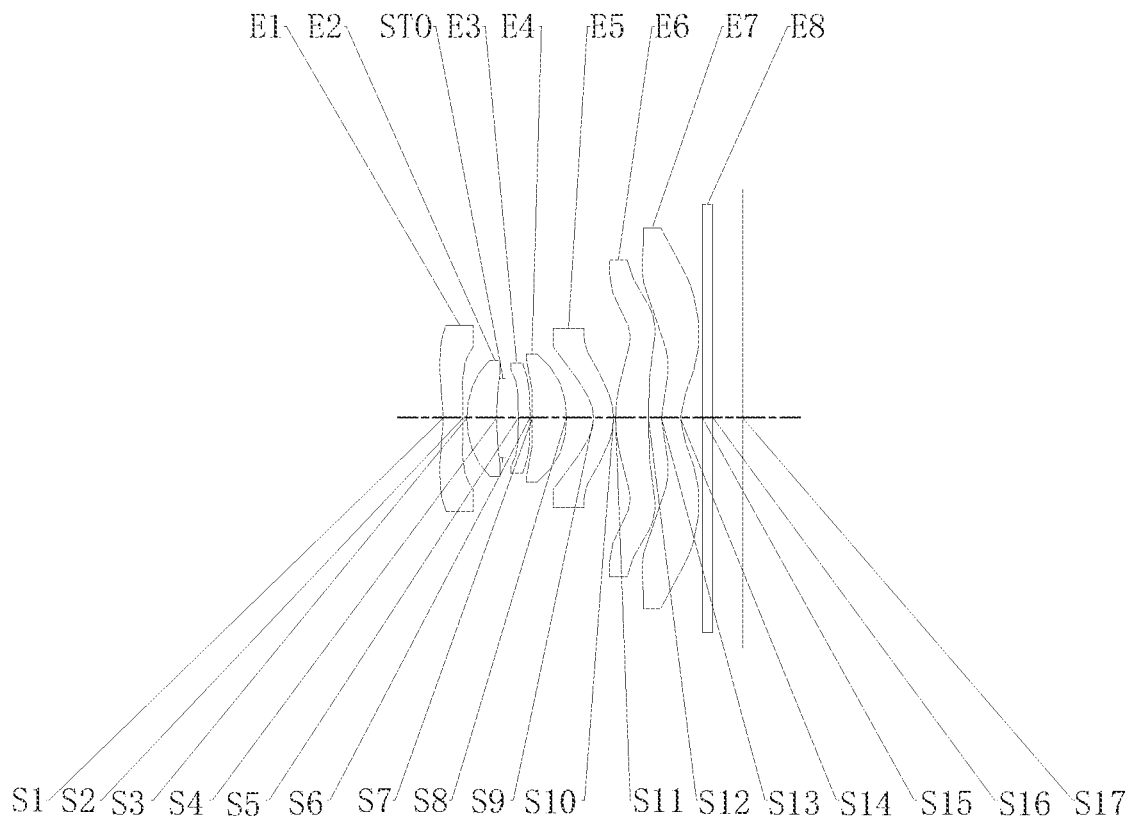
FIG. 7 is a schematic structural diagram of an optical imaging lens assembly according to example 4 of the present disclosure.

An optical imaging lens assembly according to example 4 of the present disclosure is described below with reference to FIGS. 7 to 8D. FIG. 7 shows a schematic structural diagram of an optical imaging lens assembly according to example 4 of the present disclosure.

As shown in FIG. 7, the optical imaging lens assembly includes a first lens E1, a second lens E2, a stop STO, a third lens E3, a fourth lens E4, a fifth lens E5, a sixth lens E6, a seventh lens E7, a filter E8, and an imaging surface S17 in sequence from the object side to the image side.

The first lens E1 has a negative refractive power, the object-side surface S1 of the first lens is a concave surface, and the image-side surface S2 of the first lens is a convex surface. The second lens E2 has a positive refractive power, the object-side surface S3 of the second lens is convex, and the image-side surface S4 of the second lens is concave. The third lens E3 has a negative refractive power, the object-side surface S5 thereof is a concave surface, and the image-side surface S6 thereof is a convex surface. The fourth lens E4 has a positive refractive power, the object-side surface S7 thereof is a convex surface, and the image-side surface S8 thereof is a convex surface. The fifth lens E5 has a negative refractive power, the object-side surface S9 thereof is a concave surface, and the image-side surface S10 thereof is a convex surface. The sixth lens E6 has a positive refractive power, and the object-side surface S11 thereof is a convex surface and the image-side surface S12 thereof is a concave surface. The seventh lens E7 has a negative refractive power, and the object-side surface S13 thereof is a convex surface and the image-side surface S14 thereof is a concave surface. The filter E8 has an object-side surface S15 and an image-side surface S16. Light from the object sequentially passes through the respective surfaces S1 to S16 and is finally imaged on the imaging surface S17.

In this example, the total effective focal length f of the optical imaging lens assembly is 3.59 mm, the total length TTL of the optical imaging lens assembly is 6.20 mm, a half ImgH of the diagonal length of the effective pixel area on the imaging surface S17 of the optical imaging lens assembly is 4.74 mm, a half Semi-FOV of the maximum field-of-view of the optical imaging lens assembly is 53.03°, and an aperture value Fno of the optical imaging lens assembly is 1.97.

Table 7 is a table showing basic parameters of the optical imaging lens assembly of example 4, where the units of radius of curvature, the thickness/distance, and the focal length are millimeters (mm). Tables 8-1 and 8-2 show the high-order term coefficients that applicable to each aspheric surface in example 4, where the surface shape of each aspheric surface may be defined by formula (1) given in example 1 above.

TABLE 7

| surface number | Surface type | Radius of curvature | Thickness/ distance | Material Refractive index | Abbe number | Focal length | Conical coefficient |
|---|---|---|---|---|---|---|---|
| OBJ | Spherical surface | Infinite | Infinite | | | | |
| S1 | Aspheric surface | −3.5916 | 0.4094 | 1.55 | 56.1 | −34.41 | 0.0000 |
| S2 | Aspheric surface | −4.6193 | 0.0791 | | | | 0.0000 |
| S3 | Aspheric surface | 2.2026 | 0.6170 | 1.55 | 56.1 | 5.91 | 0.0000 |
| S4 | Aspheric surface | 6.2455 | 0.1103 | | | | 0.0000 |
| STO | Spherical surface | Infinite | 0.3439 | | | | |
| S5 | Aspheric surface | −12.0156 | 0.2400 | 1.67 | 19.2 | −20.81 | 0.0000 |
| S6 | Aspheric surface | −82.3304 | 0.0444 | | | | −99.0000 |
| S7 | Aspheric surface | 18.7939 | 0.7089 | 1.55 | 56.1 | 3.67 | 0.0000 |
| S8 | Aspheric surface | −2.2106 | 0.5610 | | | | 0.0000 |
| S9 | Aspheric surface | −0.8068 | 0.4139 | 1.67 | 19.2 | −6.84 | −1.0000 |
| S10 | Aspheric surface | −1.1793 | 0.0400 | | | | −1.0000 |
| S11 | Aspheric surface | 2.9492 | 0.6818 | 1.55 | 56.1 | 9.19 | −6.8422 |
| S12 | Aspheric surface | 6.5723 | 0.2687 | | | | 0.0000 |
| S13 | Aspheric surface | 1.2701 | 0.3922 | 1.55 | 56.1 | −15.59 | −1.0000 |
| S14 | Aspheric surface | 0.9847 | 0.4602 | | | | −1.0000 |
| S15 | Spherical surface | Infinite | 0.2100 | 1.52 | 64.2 | | |
| S16 | Spherical surface | Infinite | 0.6219 | | | | |
| S17 | Spherical surface | Infinite | | | | | |

TABLE 8-1

| surface number | A4 | A6 | A8 | A10 | A12 | A14 | A16 |
|---|---|---|---|---|---|---|---|
| S1 | 6.4423E−01 | −5.9737E−02 | 1.4567E−02 | −4.6054E−03 | 9.2017E−04 | −4.7711E−04 | 6.1283E−05 |
| S2 | 4.5860E−01 | −3.3775E−02 | 1.5330E−02 | −5.8054E−03 | 9.6103E−04 | −1.2339E−03 | 1.1548E−04 |
| S3 | 1.1234E−01 | −5.2812E−03 | 5.5064E−03 | −2.4224E−03 | −4.2555E−05 | −6.0304E−04 | −1.3645E−04 |
| S4 | −5.4594E−03 | 9.4721E−04 | −3.4688E−04 | −1.1596E−04 | −7.6395E−05 | −2.3861E−05 | −9.3872E−06 |
| S5 | −8.9988E−02 | −6.4532E−03 | −2.9169E−03 | −4.6941E−04 | −1.8550E−05 | 8.2271E−05 | 2.8981E−05 |
| S6 | −1.4913E−01 | 1.6221E−02 | −4.9798E−03 | −6.6778E−06 | 2.8309E−04 | 1.4749E−04 | 8.6894E−05 |
| S7 | −1.6723E−01 | 2.3065E−02 | −2.0872E−03 | 3.5718E−04 | −1.8536E−04 | −1.1603E−04 | 9.3752E−05 |
| S8 | −1.5179E−01 | −4.2863E−03 | 7.1632E−03 | 1.2628E−03 | −1.5598E−04 | −5.1157E−04 | −2.3207E−04 |
| S9 | 5.3449E−01 | −2.7628E−02 | 1.3328E−02 | −1.4979E−02 | 1.2317E−03 | −1.0209E−03 | −5.1505E−05 |
| S10 | 8.5445E−01 | −1.2772E−02 | 1.0079E−02 | −2.5370E−02 | 9.9647E−03 | −1.4790E−03 | 4.4933E−04 |
| S11 | −1.1459E+00 | 1.1330E−01 | 1.5122E−01 | −7.7504E−02 | −9.3766E−03 | 1.2428E−02 | 4.7015E−03 |
| S12 | −1.4820E+00 | 1.1417E−01 | 1.0934E−01 | −9.6181E−03 | −4.8509E−02 | 2.0063E−02 | −4.9076E−03 |
| S13 | −7.4067E+00 | 2.1754E+00 | −7.9130E−01 | 3.0241E−01 | −1.4527E−01 | 7.3480E−02 | −2.4582E−02 |
| S14 | −9.9700E+00 | 2.2894E+00 | −7.4483E−01 | 3.2410E−01 | −1.5655E−01 | 5.3132E−02 | −3.0418E−02 |

TABLE 8-2

| surface number | A18 | A20 | A22 | A24 | A26 | A28 | A30 |
|---|---|---|---|---|---|---|---|
| S1 | −3.8032E−05 | 8.7495E−06 | 6.2519E−06 | −5.5673E−06 | 0.0000E+00 | 0.0000E+00 | 0.0000E+00 |
| S2 | −1.9807E−04 | 7.2829E−05 | 8.6910E−06 | 2.4966E−05 | 0.0000E+00 | 0.0000E+00 | 0.0000E+00 |
| S3 | −1.3222E−04 | −2.7623E−05 | 0.0000E+00 | 0.0000E+00 | 0.0000E+00 | 0.0000E+00 | 0.0000E+00 |
| S4 | 4.8786E−06 | −2.6885E−06 | 0.0000E+00 | 0.0000E+00 | 0.0000E+00 | 0.0000E+00 | 0.0000E+00 |
| S5 | 1.2667E−05 | −7.0753E−06 | −1.9430E−06 | 0.0000E+00 | 0.0000E+00 | 0.0000E+00 | 0.0000E+00 |
| S6 | 1.2595E−05 | −1.9037E−05 | −1.6611E−05 | 6.0460E−06 | 0.0000E+00 | 0.0000E+00 | 0.0000E+00 |
| S7 | 4.2711E−05 | −2.7724E−05 | −2.0203E−05 | 5.2913E−06 | 2.8282E−06 | 0.0000E+00 | 0.0000E+00 |
| S8 | −4.7991E−06 | 5.7364E−05 | 2.0114E−05 | 8.8571E−06 | −2.7329E−06 | 0.0000E+00 | 0.0000E+00 |
| S9 | −8.4277E−06 | −8.3642E−05 | −5.1387E−05 | 2.0156E−05 | 4.1867E−06 | 1.0111E−05 | 1.3779E−06 |
| S10 | 1.0451E−04 | −2.9582E−04 | 5.6281E−05 | 5.2278E−05 | −1.8775E−05 | −9.5749E−07 | 0.0000E+00 |
| S11 | −4.7725E−03 | −8.9283E−04 | 2.2150E−03 | −1.0979E−03 | 1.7100E−04 | 1.1544E−04 | 2.6578E−05 |
| S12 | 1.2904E−02 | −1.3749E−02 | 7.4020E−03 | −4.0075E−03 | 2.8676E−03 | −1.4923E−03 | 3.1070E−04 |
| S13 | 6.0829E−03 | −1.0269E−02 | 1.4376E−02 | −1.1315E−02 | 5.1639E−03 | −1.0165E−03 | 2.0521E−06 |
| S14 | 2.6807E−02 | −1.2495E−02 | 5.6516E−03 | −5.5967E−03 | 2.6999E−03 | −1.8276E−03 | 1.1199E−03 |

Figure 8A:
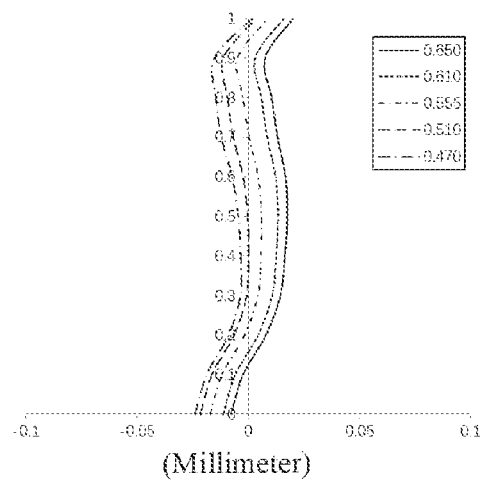
FIGS. 8A to 8D show longitudinal aberration curves, astigmatic curves, a distortion curve, and a lateral color curve of the optical imaging lens assembly of example 4 respectively.
Figure 8B:
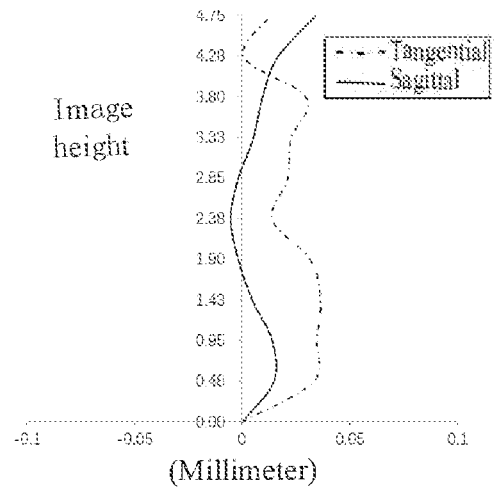
Figure 8C:
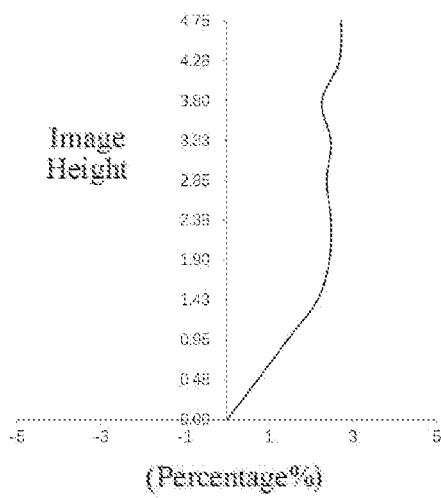
Figure 8D:
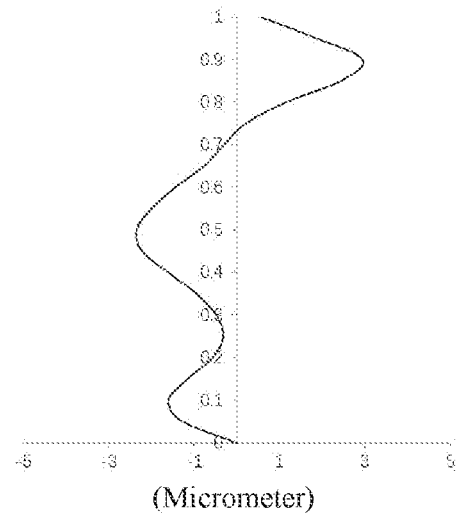

FIG. 8a shows longitudinal aberration curves of the optical imaging lens assembly of example 4, representing the deviation of the convergence focus of lights of different wavelengths passing through the lens assembly. FIG. 8B shows astigmatic curves of the optical imaging lens assembly of example 4, representing the curvatures of a tangential plane and the curvatures of a sagittal plane. FIG. 8C shows a distortion curve of the optical imaging lens assembly of example 4, representing the amounts of distortion corresponding to different image heights. FIG. 8D shows a lateral color curve of the optical imaging lens assembly of example 4 representing the deviation of different heights of images on the imaging plane formed by light passing through the optical imaging lens assembly. As can be seen from FIGS. 8a to 8D, the optical imaging lens assembly according to example 4 can achieve good imaging quality.

EXAMPLE 5

Figure 9:
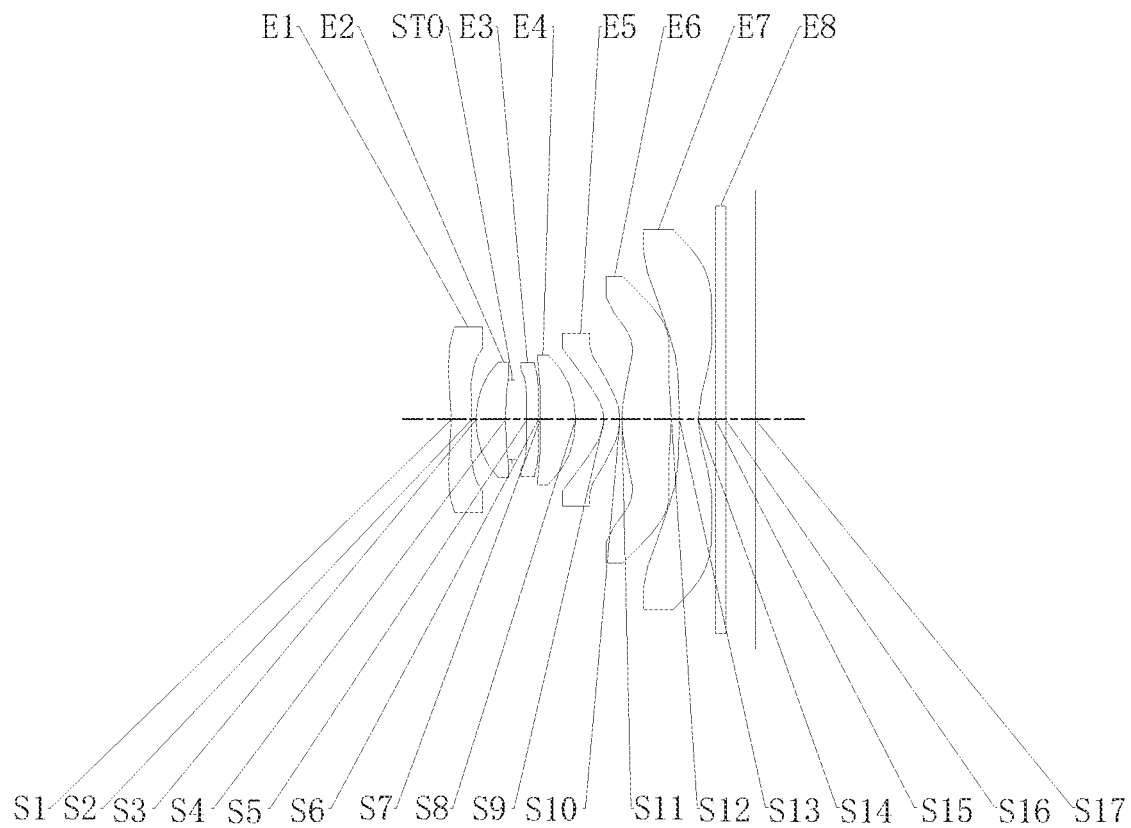
FIG. 9 is a schematic structural diagram of an optical imaging lens assembly according to example 5 of the present disclosure.

An optical imaging lens assembly according to example 5 of the present disclosure is described below with reference to FIGS. 9 to 10D. FIG. 9 shows a schematic structural diagram of an optical imaging lens assembly according to example 5 of the present disclosure.

As shown in FIG. 9, the optical imaging lens assembly includes a first lens E1, a second lens E2, a stop STO, a third lens E3, a fourth lens E4, a fifth lens E5, a sixth lens E6, a seventh lens E7, a filter E8, and an imaging surface S17 in sequence from the object side to the image side.

The first lens E1 has a negative refractive power, the object-side surface S1 of the first lens is a concave surface, and the image-side surface S2 of the first lens is a convex surface. The second lens E2 has a positive refractive power, the object-side surface S3 of the second lens is convex, and the image-side surface S4 of the second lens is concave. The third lens E3 has a negative refractive power, and the object-side surface S5 thereof is a convex surface and the image-side surface S6 thereof is a concave surface. The fourth lens E4 has a positive refractive power, the object-side surface S7 thereof is a convex surface, and the image-side surface S8 thereof is a convex surface. The fifth lens E5 has a negative refractive power, the object-side surface S9 thereof is a concave surface, and the image-side surface S10 thereof is a convex surface. The sixth lens E6 has a positive refractive power, and the object-side surface S11 thereof is a convex surface and the image-side surface S12 thereof is a convex surface. The seventh lens E7 has a negative refractive power, the object-side surface S13 thereof is a concave surface, and the image-side surface S14 thereof is a concave surface. The filter E8 has an object-side surface S15 and an image-side surface S16. Light from the object sequentially passes through the respective surfaces S1 to S16 and is finally imaged on the imaging surface S17.

In this example, the total effective focal length f of the optical imaging lens assembly is 3.59 mm, the total length TTL of the optical imaging lens assembly is 6.31 mm, a half ImgH of the diagonal length of the effective pixel area on the imaging surface S17 of the optical imaging lens assembly is 4.74 mm, a half Semi-FOV of the maximum field-of-view of the optical imaging lens assembly is 52.12°, and an aperture value Fno of the optical imaging lens assembly is 1.97.

Table 9 is a table showing basic parameters of the optical imaging lens assembly of example 5, where the units of radius of curvature, the thickness/distance, and the focal length are millimeters (mm). Tables 10-1, 10-2 show the high-order term coefficients that applicable to each aspheric surface in example 5, where the surface shape of each aspheric surface may be defined by formula (1) given in example 1 above.

TABLE 9

| | | | | Material | | | |
|---|---|---|---|---|---|---|---|
| surface number | Surface type | Radius of curvature | Thickness/ distance | Refractive index | Abbe number | Focal length | Conical coefficient |
| OBJ | Spherical surface | Infinite | Infinite | | | | |
| S1 | Aspheric surface | −3.7665 | 0.4200 | 1.55 | 56.1 | −52.33 | 0.0000 |
| S2 | Aspheric surface | −4.5093 | 0.0937 | | | | 1.0203 |
| S3 | Aspheric surface | 2.3857 | 0.6081 | 1.55 | 56.1 | 6.46 | 0.0000 |

TABLE 9-continued

| surface number | Surface type | Radius of curvature | Thickness/ distance | Material Refractive index | Abbe number | Focal length | Conical coefficient |
|---|---|---|---|---|---|---|---|
| S4 | Aspheric surface | 6.7204 | 0.1063 | | | | 0.0000 |
| STO | Spherical surface | Infinite | 0.3376 | | | | |
| S5 | Aspheric surface | 96.4841 | 0.2400 | 1.67 | 19.2 | −16.42 | 0.0000 |
| S6 | Aspheric surface | 9.9582 | 0.0400 | | | | 0.0000 |
| S7 | Aspheric surface | 15.0019 | 0.7310 | 1.55 | 56.1 | 3.60 | 0.0000 |
| S8 | Aspheric surface | −2.2201 | 0.5915 | | | | 0.0000 |
| S9 | Aspheric surface | −0.6908 | 0.3284 | 1.67 | 19.2 | −5.04 | −1.0000 |
| S10 | Aspheric surface | −1.0326 | 0.0400 | | | | −1.0000 |
| S11 | Aspheric surface | 2.2695 | 1.0292 | 1.55 | 56.1 | 2.93 | −1.2452 |
| S12 | Aspheric surface | −4.5583 | 0.1656 | | | | 0.0000 |
| S13 | Aspheric surface | −65.8384 | 0.3900 | 1.55 | 56.1 | −3.30 | −99.0000 |
| S14 | Aspheric surface | 1.8576 | 0.3578 | | | | −1.0000 |
| S15 | Spherical surface | Infinite | 0.2100 | 1.52 | 64.2 | | |
| S16 | Spherical surface | Infinite | 0.6219 | | | | |
| S17 | Spherical surface | Infinite | | | | | |

TABLE 10-1

| surface number | A1 | A6 | A8 | A10 | A12 | A14 | A16 |
|---|---|---|---|---|---|---|---|
| S1 | 6.2216E−01 | −6.2982E−02 | 1.5519E−02 | 4.6308E−03 | 9.2425E−04 | 4.2546E−04 | 4.5801E−05 |
| S2 | 4.8340E−01 | −4.2029E−02 | 1.7535E−02 | −5.8111E−03 | 1.1621E−03 | 4.1427E−03 | 1.0594E−04 |
| S3 | 1.2998E−01 | −9.2700E−03 | 6.7305E−03 | −2.1755E−03 | 2.2248E−04 | −4.8564E−04 | −7.4596E−05 |
| S4 | −4.5846E−03 | 8.2175E−04 | −1.4588E−04 | −6.1911E−05 | −4.9733E−05 | −4.6062E−05 | −6.2514E−06 |
| S5 | −9.9557E−02 | −8.3126E−03 | −2.8471E−03 | −1.8511E−04 | −4.5980E−04 | 8.9343E−05 | 2.0657E−05 |
| S6 | −1.5411E−01 | 1.1969E−02 | −4.3951E−03 | 5.6142E−05 | 3.2823E−04 | 3.2597E−04 | 7.9423E−05 |
| S7 | −1.2349E−01 | 2.4435E−02 | −2.5129E−03 | −5.9254E−04 | 1.7208E−04 | 2.8371E−04 | 9.5133E−05 |
| S8 | −1.1418E−01 | 1.5353E−03 | 6.7300E−03 | 1.3419E−04 | −6.7619E−04 | −5.0439E−04 | 1.0937E−06 |
| S9 | 7.6351E−01 | −7.2142E−02 | 2.4053E−02 | −1.9136E−02 | 2.1076E−03 | −1.5575E−03 | 4.1118E−04 |
| S10 | 9.0163E−01 | −1.6530E−01 | 1.3703E−02 | −2.3239E−02 | 5.6503E−03 | 3.6924E−04 | 6.4964E−04 |
| S11 | −2.1025E+00 | 2.7912E−01 | 6.7489E−02 | −1.9363E−02 | −3.4950E−02 | 1.9302E−02 | 2.5832E−03 |
| S12 | 2.8906E−01 | −3.6747E−01 | 2.4103E−01 | −5.9008E−02 | −4.9116E−03 | 1.1383E−02 | −1.5054E−02 |
| S13 | −9.4403E−01 | 3.4996E−01 | −9.0983E−02 | 3.5471E−02 | −1.2871E−02 | −1.1348E−02 | 8.5245E−03 |
| S14 | −5.3258E+00 | 9.2708E−01 | −3.4499E−01 | 1.5662E−01 | −4.0474E−02 | −3.9312E−03 | −1.1814E−03 |

TABLE 10-2

| surface number | A18 | A20 | A22 | A24 | A26 | A28 | A30 |
|---|---|---|---|---|---|---|---|
| S1 | −2.9815E−05 | 8.0013E−07 | 8.2662E−06 | −6.2174E−06 | 0.0000E+00 | 0.0000E+00 | 0.0000E+00 |
| S2 | −1.8819E−04 | 5.1291E−05 | 5.1488E−06 | 1.9667E−05 | 0.0000E+00 | 0.0000E+00 | 0.0000E+00 |
| S3 | −1.0291E−04 | −1.6381E−05 | 0.0000E+00 | 0.0000E+00 | 0.0000E+00 | 0.0000E+00 | 0.0000E+00 |
| S4 | 3.3774E−06 | −1.3535E−06 | 0.0000E+00 | 0.0000E+00 | 0.0000E+00 | 0.0000E+00 | 0.0000E+00 |
| S5 | 1.7980E−05 | −1.7508E−06 | 2.7374E−06 | 0.0000E+00 | 0.0000E+00 | 0.0000E+00 | 0.0000E+00 |
| S6 | 3.0402E−05 | −2.8538E−05 | 4.5201E−05 | 2.8831E−06 | 0.0000E+00 | 0.0000E+00 | 0.0000E+00 |
| S7 | 1.4339E−05 | −5.5886E−05 | 4.8329E−05 | 1.0180E−05 | 1.0335E−06 | 0.0000E+00 | 0.0000E+00 |
| S8 | 1.3814E−04 | 1.3455E−04 | 2.7249E−05 | 1.0755E−06 | −1.6042E−05 | 0.0000E+00 | 0.0000E+00 |
| S9 | −2.2842E−04 | 9.1905E−05 | −8.5187E−05 | 3.0684E−05 | −4.5357E−06 | 7.4895E−06 | 0.0000E+00 |
| S10 | −2.3336E−04 | −7.1557E−05 | −1.2744E−04 | 8.1790E−05 | 4.3160E−06 | 0.0000E+00 | 0.0000E+00 |

TABLE 10-2-continued

| surface number | A18 | A20 | A22 | A24 | A26 | A28 | A30 |
|---|---|---|---|---|---|---|---|
| S11 | −1.8449E−03 | −2.9658E−03 | 1.7201E−03 | 4.3976E−04 | −4.5407E−04 | −1.8464E−04 | 1.3531E−04 |
| S12 | 6.6927E−03 | −2.0151E−03 | 2.1530E−03 | −6.6835E−04 | −3.2750E−04 | 1.9214E−04 | −2.4681E−05 |
| S13 | 5.4468E−03 | −8.6196E−03 | 4.4049E−03 | −1.1836E−03 | 1.7735E−04 | −1.3847E−05 | 4.2996E−07 |
| S14 | 1.3103E−03 | 2.1003E−03 | 2.7467E−03 | −1.1933E−03 | −3.5058E−05 | 4.8101E−04 | −1.8451E−04 |

Figure 10A:
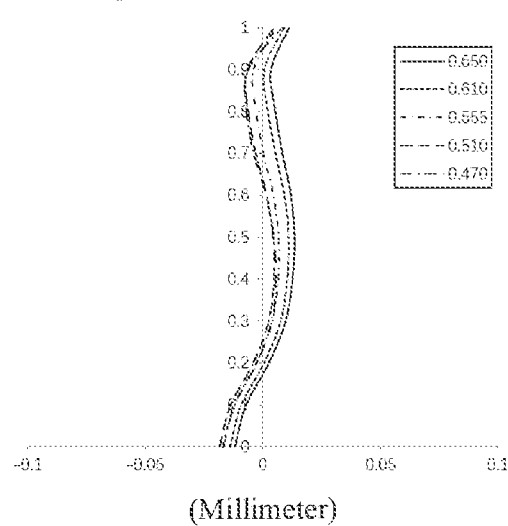
FIGS. 10A to 10D show longitudinal aberration curves, astigmatic curves, a distortion curves and a lateral color curve of the optical imaging lens assembly of example 5 respectively.
Figure 10B:
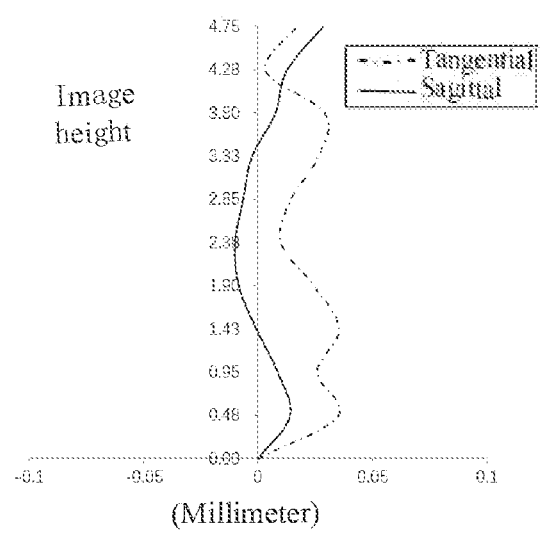
Figure 10C:
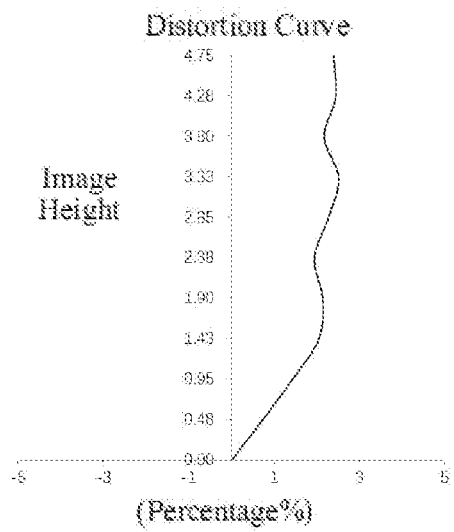
Figure 10D:
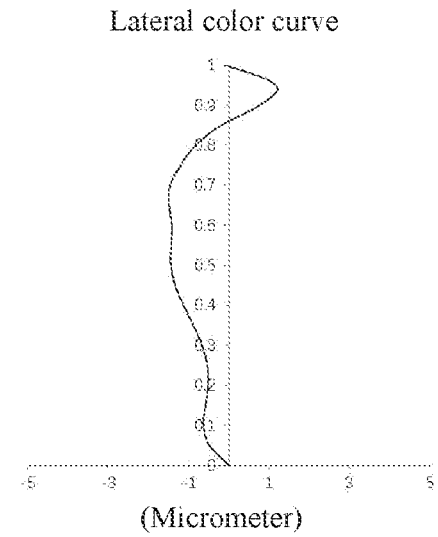

FIG. 10A shows longitudinal aberration curves of the optical imaging lens assembly of example 5, representing the deviation of the convergence focus of lights of different wavelengths passing through the lens assembly. FIG. 10B shows astigmatic curves of the optical imaging lens assembly of example 5, representing the curvatures of a tangential plane and the curvatures of a sagittal plane. FIG. 10C shows a distortion curve of the optical imaging lens assembly of example 5, representing the amounts of distortion corresponding to different image heights. FIG. 10D shows a lateral color curve of the optical imaging lens assembly of example 5 representing the deviation of different heights of images on the imaging plane formed by light passing through the optical imaging lens assembly. As can be seen from FIGS. 10a to 10D, the optical imaging lens assembly according to example 5 can achieve good imaging quality.

EXAMPLE 6

Figure 11:
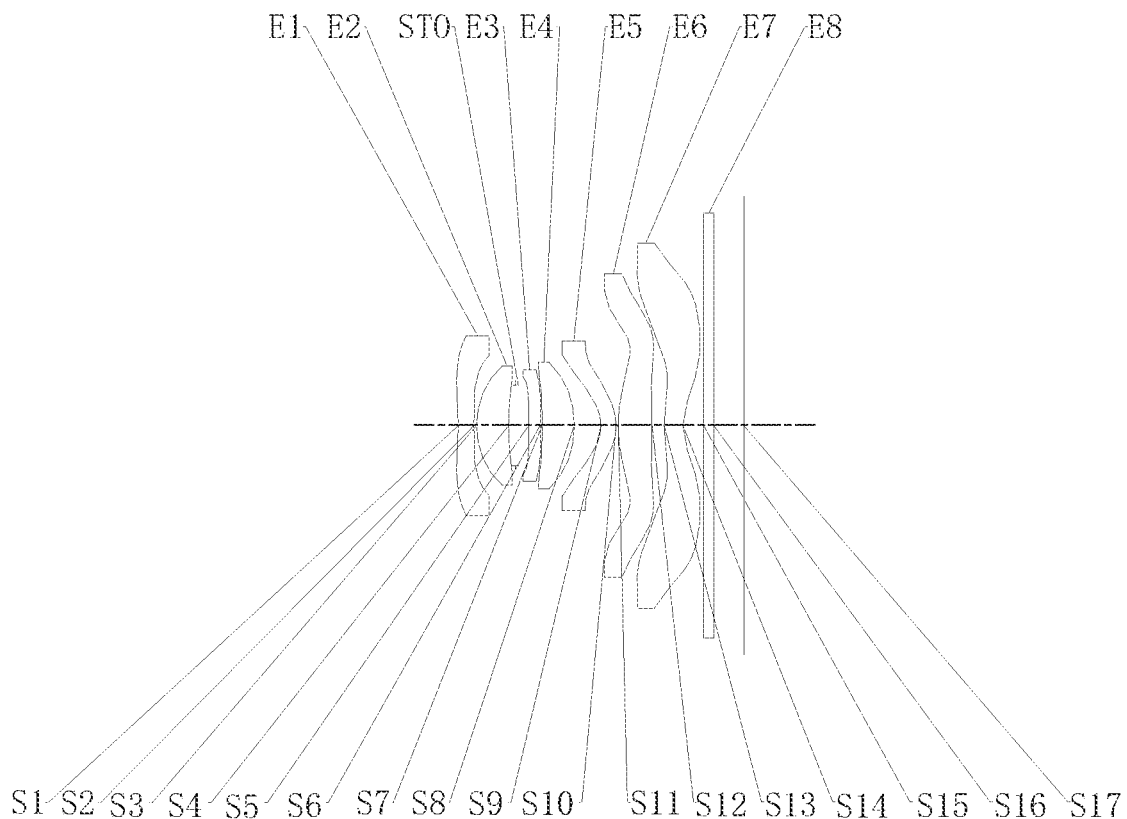
FIG. 11 is a schematic structural diagram of an optical imaging lens assembly according to example 6 of the present disclosure.

An optical imaging lens assembly according to example 6 of the present disclosure is described below with reference to FIGS. 11 to 12D. FIG. 11 shows a schematic structural diagram of an optical imaging lens assembly according to example 6 of the present disclosure.

As shown in FIG. 11, the optical imaging lens assembly includes a first lens E1, a second lens E2, a stop STO, a third lens E3, a fourth lens E4, a fifth lens E5, a sixth lens E6, a seventh lens E7, a filter E8, and an imaging surface S17 in sequence from the object side to the image side.

The first lens E1 has a negative refractive power, the object-side surface S1 of the first lens is a concave surface, and the image-side surface S2 of the first lens is a convex surface. The second lens E2 has a positive refractive power, the object-side surface S3 of the second lens is convex, and the image-side surface S4 of the second lens is concave. The third lens E3 has a negative refractive power, and the object-side surface S5 thereof is a convex surface and the image-side surface S6 thereof is a concave surface. The fourth lens E4 has a positive refractive power, the object-side surface S7 thereof is a convex surface, and the image-side surface S8 thereof is a convex surface. The fifth lens E5 has a negative refractive power, the object-side surface S9 thereof is a concave surface, and the image-side surface S10 thereof is a convex surface. The sixth lens E6 has a positive refractive power, and the object-side surface S11 thereof is a convex surface and the image-side surface S12 thereof is a convex surface. The seventh lens E7 has a negative refractive power, and the object-side surface S13 thereof is a convex surface and the image-side surface S14 thereof is a concave surface. The filter E8 has an object-side surface S15 and an image-side surface S16. Light from the object sequentially passes through the respective surfaces S1 to S16 and is finally imaged on the imaging surface S17.

In this example, the total effective focal length f of the optical imaging lens assembly is 3.55 mm, the total length TTL of the optical imaging lens assembly is 5.93 mm, a half ImgH of the diagonal length of the effective pixel area on the imaging surface S17 of the optical imaging lens assembly is 4.74 mm, a half Semi-FOV of the maximum field-of-view of the optical imaging lens assembly is 52.43°, and an aperture value Fno of the optical imaging lens assembly is 1.86.

Table 11 is a table showing basic parameters of the optical imaging lens assembly of example 6, where the units of radius of curvature, the thickness/distance, and the focal length are millimeters (mm). Tables 12-1 and 12-2 show the high-order term coefficients that applicable to each aspheric surface in example 6, where the surface shape of each aspheric surface may be defined by formula (1) given in example 1 above.

TABLE 11

| surface number | Surface type | Radius of curvature | Thickness/ distance | Material Refractive index | Material Abbe number | Focal length | Conical coefficient |
|---|---|---|---|---|---|---|---|
| OBJ | Spherical surface | Infinite | Infinite | | | | |
| S1 | Aspheric surface | −4.1232 | 0.3242 | 1.55 | 56.1 | −19.15 | 0.0000 |
| S2 | Aspheric surface | −6.9973 | 0.0568 | | | | 1.0941 |
| S3 | Aspheric surface | 2.0439 | 0.6635 | 1.55 | 56.1 | 5.29 | 0.0000 |
| S4 | Aspheric surface | 6.1829 | 0.1162 | | | | 0.0000 |
| STO | Spherical surface | Infinite | 0.3007 | | | | |
| S5 | Aspheric surface | 29.4970 | 0.2400 | 1.67 | 19.2 | −22.81 | 0.0000 |
| S6 | Aspheric surface | 10.1012 | 0.0400 | | | | 0.0000 |
| S7 | Aspheric surface | 36.7921 | 0.6695 | 1.55 | 56.1 | 4.02 | 0.0000 |

TABLE 11-continued

| surface number | Surface type | Radius of curvature | Thickness/ distance | Material Refractive index | Abbe number | Focal length | Conical coefficient |
|---|---|---|---|---|---|---|---|
| S8 | Aspheric surface | −2.3213 | 0.5580 | | | | 0.0000 |
| S9 | Aspheric surface | −0.7701 | 0.3123 | 1.67 | 19.2 | −6.89 | −1.0000 |
| S10 | Aspheric surface | −1.0734 | 0.0400 | | | | −1.0000 |
| S11 | Aspheric surface | 2.7106 | 0.7077 | 1.55 | 56.1 | 4.03 | −0.8255 |
| S12 | Aspheric surface | −10.5602 | 0.2516 | | | | 0.0000 |
| S13 | Aspheric surface | 2.4582 | 0.3900 | 1.55 | 56.1 | −4.54 | −0.9458 |
| S14 | Aspheric surface | 1.1650 | 0.4306 | | | | −1.0000 |
| S15 | Spherical surface | Infinite | 0.2100 | 1.52 | 64.2 | | |
| S16 | Spherical surface | Infinite | 0.6219 | | | | |
| S17 | Spherical surface | Infinite | | | | | |

TABLE 12-1

| surface number | A4 | A6 | A8 | A10 | A12 | A14 | A16 |
|---|---|---|---|---|---|---|---|
| S1 | 6.4108E−01 | −6.9492E−02 | 1.8366E−02 | −5.9395E−03 | 1.5908E−03 | −7.3008E−04 | 1.9590E−04 |
| S2 | 4.6118E−01 | −3.6593E−02 | 1.8418E−02 | −6.1214E−03 | 1.7889E−03 | −1.3503E−03 | 2.8527E−04 |
| S3 | 1.0567E−01 | −5.1552E−03 | 7.2978E−03 | −2.7735E−03 | 4.7726E−04 | −6.6899E−04 | 6.3251E−06 |
| S4 | −4.2083E−03 | 8.3168E−04 | −3.0962E−04 | −5.2854E−05 | 4.9679E−05 | −5.8347E−06 | −8.4847E−06 |
| S5 | −9.8350E−02 | −8.6912E−03 | −2.7462E−03 | −3.7757E−04 | −6.8686E−05 | 8.9885E−05 | 2.1915E−05 |
| S6 | −1.4412E−01 | 8.6924E−03 | −1.9830E−03 | −1.1364E−03 | 1.4977E−04 | 5.0031E−04 | 9.0826E−05 |
| S7 | −1.0715E−01 | 1.8957E−02 | 5.3826E−04 | −1.8062E−03 | 1.7713E−05 | 4.6577E−04 | 1.1226E−05 |
| S8 | 1.1453E−01 | −1.1952E−03 | 6.7349E−03 | 1.2710E−03 | −9.1330E−05 | −5.0826E−04 | −2.3770E−04 |
| S9 | 6.0645E−01 | −4.2714E−02 | 1.9822E−02 | −1.5699E−02 | 1.6807E−03 | −1.5853E−03 | 1.6439E−04 |
| S10 | 7.6006E−01 | 5.0159E−03 | 1.0387E−02 | −2.2308E−03 | 5.8823E−03 | −5.2876E−04 | 6.1080E−04 |
| S11 | −2.0519E+00 | 2.2426E−01 | 1.1591E−01 | −3.9650E−02 | −3.2683E−02 | 1.5179E−02 | 6.3465E−03 |
| S12 | −6.3084E−02 | −2.1067E−01 | 2.0659E−01 | −6.7459E−02 | −4.0183E−03 | −1.7537E−03 | 6.0578E−04 |
| S13 | −4.1498E+00 | 1.2749E+00 | −4.4162E−01 | 1.5464E−01 | −6.4808E−02 | 1.9096E−02 | 6.0703E−03 |
| S14 | −7.9779E+00 | 1.6141E+00 | −4.9381E−01 | 2.5252E−01 | −9.8442E−02 | 2.1069E−02 | −2.0013E−02 |

TABLE 12-2

| surface number | A18 | A20 | A22 | A24 | A26 | A28 | A30 |
|---|---|---|---|---|---|---|---|
| S1 | −9.3620E−05 | 3.2302E−05 | −6.7471E−06 | −9.4763E−07 | 0.0000E+00 | 0.0000E+00 | 0.0000E+00 |
| S2 | −2.7780E−04 | 8.2305E−05 | −1.7903E−05 | 2.5594E−05 | 0.0000E+00 | 0.0000E+00 | 0.0000E+00 |
| S3 | −1.3517E−04 | 1.9224E−07 | 0.0000E+00 | 0.0000E+00 | 0.0000E+00 | 0.0000E+00 | 0.0000E+00 |
| S4 | 3.6265E−06 | −3.7377E−06 | 0.0000E+00 | 0.0000E+00 | 0.0000E+00 | 0.0000E+00 | 0.0000E+00 |
| S5 | 1.2469E−05 | −2.5732E−06 | 1.5108E−06 | 0.0000E+00 | 0.0000E+00 | 0.0000E+00 | 0.0000E+00 |
| S6 | −6.7390E−06 | −1.0867E−05 | −9.3902E−06 | −1.3012E−06 | 0.0000E+00 | 0.0000E+00 | 0.0000E+00 |
| S7 | −4.7193E−05 | −1.7714E−05 | −6.5133E−06 | −1.0548E−06 | 4.1042E−06 | 0.0000E+00 | 0.0000E+00 |
| S8 | −5.8019E−05 | 5.6923E−05 | 2.0290E−05 | 1.7748E−05 | −5.3559E−06 | 0.0000E+00 | 0.0000E+00 |
| S9 | −1.9688E−04 | 1.0698E−04 | −1.1910E−04 | 1.3694E−05 | −2.9886E−06 | 1.2722E−05 | 0.0000E+00 |
| S10 | −2.4159E−05 | 3.3701E−05 | −1.9582E−04 | 7.6982E−05 | 3.4291E−06 | 0.0000E+00 | 0.0000E+00 |
| S11 | −1.5885E−03 | −3.8023E−03 | 1.9023E−03 | 1.1854E−04 | −2.1067E−04 | −6.0843E−05 | 6.4436E−05 |
| S12 | 6.5224E−03 | −5.7574E−03 | 3.5695E−03 | −2.1076E−03 | 8.2989E−04 | −1.8240E−04 | 1.9309E−05 |
| S13 | −5.8589E−03 | −4.0910E−03 | 8.0512E−03 | −5.4932E−03 | 1.9116E−03 | −2.9084E−04 | 8.4683E−06 |
| S14 | 1.4330E−02 | −2.8786E−03 | 3.6797E−03 | −3.2985E−03 | 1.2426E−03 | −9.8413E−04 | 3.7062E−04 |

Figure 12A:
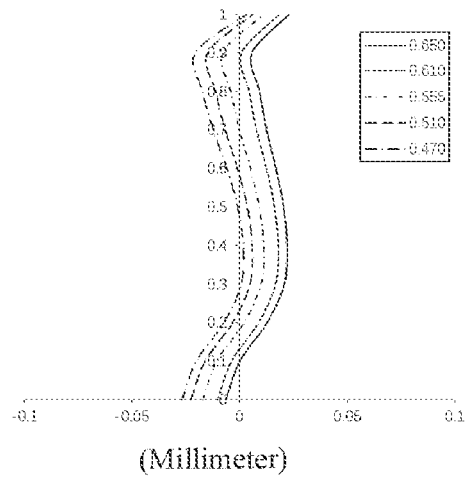
FIGS. 12A to 12D show longitudinal aberration curves, astigmatic curves, a distortion curve, and a lateral color curve of the optical imaging lens assembly of example 6 respectively.
Figure 12B:
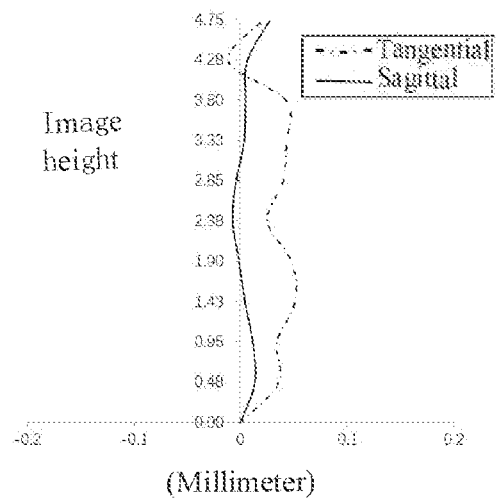
Figure 12C:
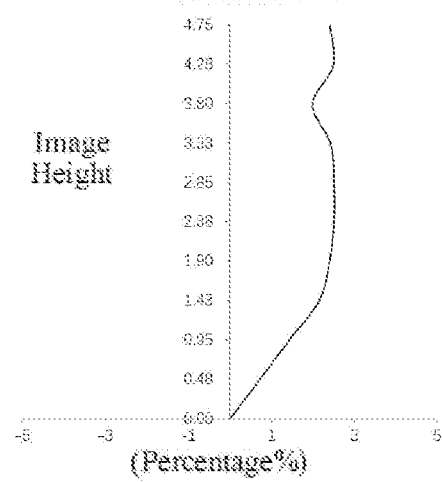
Figure 12D:
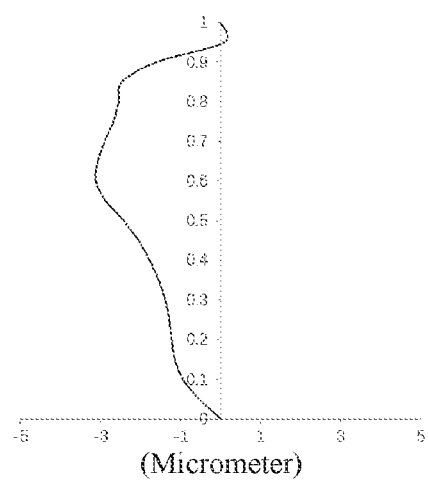

FIG. 12A shows longitudinal aberration curves of the optical imaging lens assembly of example 6, representing the deviation of the convergence focus of lights of different wavelengths passing through the lens assembly. FIG. 12B shows astigmatic curves of the optical imaging lens assembly of example 6, representing the curvatures of a tangential plane and the curvatures of a sagittal plane. FIG. 12C shows a distortion curve of the optical imaging lens assembly of example 6, representing the amounts of distortion corresponding to different image heights. FIG. 12D shows a lateral color curve of the optical imaging lens assembly of example 6 representing the deviation of different heights of images on the imaging plane formed by light passing through the optical imaging lens assembly. As can be seen from FIGS. 12A to 12D, the optical imaging lens assembly according to example 6 can achieve good imaging quality.

EXAMPLE 7

Figure 13:
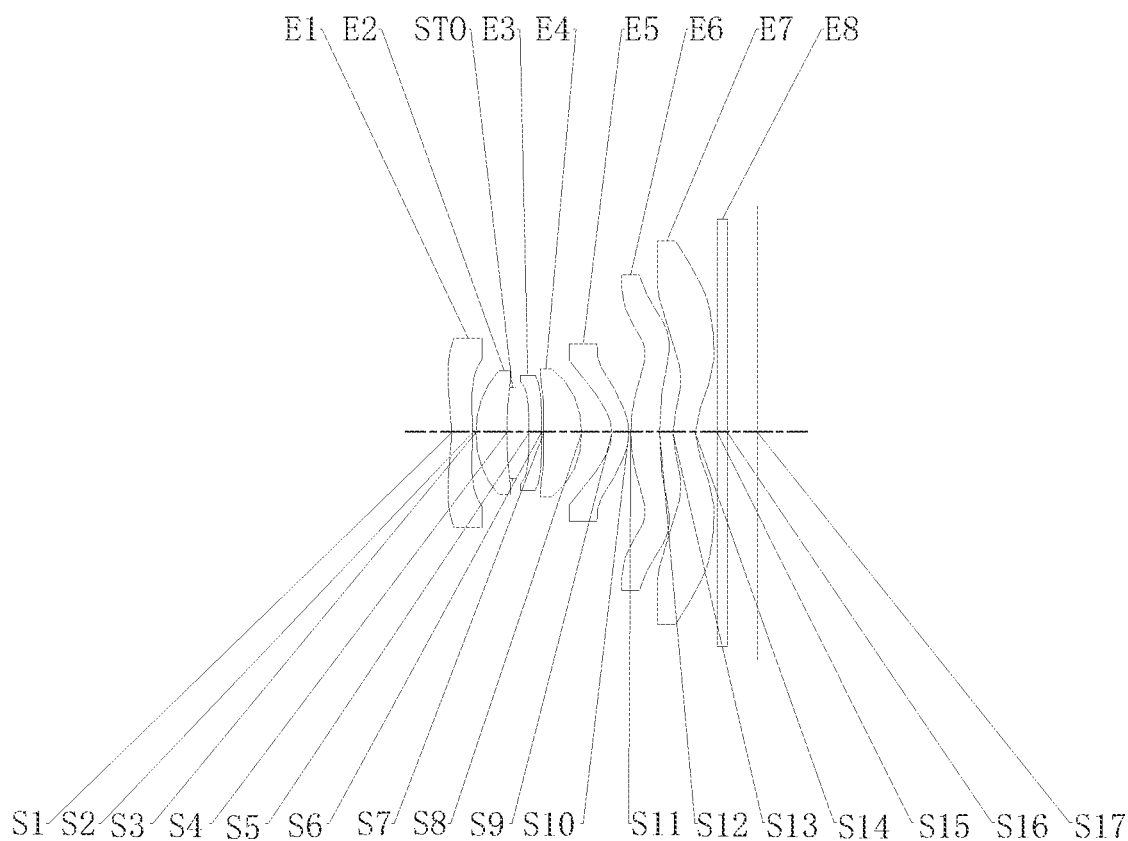
FIG. 13 is a schematic structural diagram of an optical imaging lens assembly according to example 7 of the present disclosure.

An optical imaging lens assembly according to example 7 of the present disclosure is described below with reference to FIGS. 13 to 14D. FIG. 13 shows a schematic structural diagram of an optical imaging lens assembly according to example 7 of the present disclosure.

As shown in FIG. 13, the optical imaging lens assembly includes a first lens E1, a second lens E2, a stop STO, a third lens E3, a fourth lens E4, a fifth lens E5, a sixth lens E6, a seventh lens E7, a filter E8, and an imaging surface S17 in sequence from the object side to the image side.

The first lens E1 has a negative refractive power, the object-side surface S1 of the first lens is a concave surface, and the image-side surface S2 of the first lens is a convex surface. The second lens E2 has a positive refractive power, the object-side surface thereof S3 is convex, and the image-side surface S4 thereof is concave. The third lens E3 has a negative refractive power, the object-side surface S5 thereof is concave, and the image-side surface S6 thereof is concave. The fourth lens E4 has a positive refractive power, the object-side surface S7 thereof is a convex surface, and the image-side surface S8 thereof is a convex surface. The fifth lens E5 has a negative refractive power, the object-side surface S9 thereof is a concave surface, and the image-side surface S10 thereof is a convex surface. The sixth lens E6 has a negative refractive power, and the object-side surface S11 thereof is a convex surface and the image-side surface S12 thereof is a concave surface. The seventh lens E7 has a negative refractive power, and the object-side surface S13 thereof is a convex surface and the image-side surface S14 thereof is a concave surface. The filter E8 has an object-side surface S15 and an image-side surface S16. Light from the object sequentially passes through the respective surfaces S1 to S16 and is finally imaged on the imaging surface S17.

In this example, the total effective focal length f of the optical imaging lens assembly is 3.61 mm, the total length TTL of the optical imaging lens assembly is 6.35 mm, a half ImgH of the diagonal length of the effective pixel area on the imaging surface S17 of the optical imaging lens assembly is 4.74 mm, a half Semi-FOV of the maximum field-of-view of the optical imaging lens assembly is 51.86°, and an aperture value Fno of the optical imaging lens assembly is 1.79.

Table 13 is a table showing basic parameters of the optical imaging lens assembly of example 7, where the units of radius of curvature, the thickness/distance, and the focal length are millimeters (mm). Tables 14-1 and 14-2 show the high-order term coefficients that applicable to each aspheric surface in example 7, where the surface shape of each aspheric surface may be defined by formula (1) given in example 1 above.

TABLE 13

| surface number | Surface type | Radius of curvature | Thickness/ distance | Material Refractive index | Abbe number | Focal length | Conical coefficient |
|---|---|---|---|---|---|---|---|
| OBJ | Spherical surface | Infinite | Infinite | | | | |
| S1 | Aspheric surface | −3.4901 | 0.4309 | 1.55 | 56.1 | −34.94 | 0.0000 |
| S2 | Aspheric surface | −4.4580 | 0.0694 | | | | 0.0000 |
| S3 | Aspheric surface | 2.3949 | 0.6393 | 1.55 | 56.1 | 6.54 | 0.0000 |
| S4 | Aspheric surface | 6.5889 | 0.1121 | | | | 0.0000 |
| STO | Spherical surface | Infinite | 0.3535 | | | | |
| S5 | Aspheric surface | −24.6732 | 0.2600 | 1.67 | 19.2 | −12.40 | 0.0000 |
| S6 | Aspheric surface | 12.7829 | 0.0456 | | | | −72.7769 |
| S7 | Aspheric surface | 10.7654 | 0.7851 | 1.55 | 56.1 | 3.30 | 0.0000 |
| S8 | Aspheric surface | −2.1053 | 0.6291 | | | | 0.0000 |
| S9 | Aspheric surface | −0.8196 | 0.3529 | 1.67 | 19.2 | −20.44 | −1.0000 |
| S10 | Aspheric surface | −1.0226 | 0.0400 | | | | −1.0000 |
| S11 | Aspheric surface | 5.1458 | 0.5961 | 1.55 | 56.1 | −237.53 | 0.0000 |
| S12 | Aspheric surface | 4.7470 | 0.2774 | | | | 0.0000 |
| S13 | Aspheric surface | 1.3084 | 0.4653 | 1.55 | 56.1 | −38.28 | −1.0000 |
| S14 | Aspheric surface | 1.0767 | 0.4575 | | | | −1.0000 |
| S15 | Spherical surface | Infinite | 0.2100 | 1.52 | 64.2 | | |
| S16 | Spherical surface | Infinite | 0.6282 | | | | |
| S17 | Spherical surface | Infinite | | | | | |

TABLE 14-1

| surface number | A4 | A6 | A8 | A10 | A12 | A14 | A16 |
|---|---|---|---|---|---|---|---|
| S1 | 6.9222E−01 | −6.5407E−02 | 1.5298E−02 | −4.9995E−03 | 1.0787E−03 | −5.3347E−04 | 7.4370E−05 |
| S2 | 4.8126E−01 | −3.6948E−02 | 1.5729E−02 | −6.5564E−03 | 1.1963E−03 | −1.3774E−03 | 1.8654E−04 |
| S3 | 9.7196E−02 | −6.0623E−03 | 6.3718E−03 | −3.0091E−03 | 1.0140E−04 | −7.3221E−04 | −1.2426E−04 |
| S4 | −1.3550E−02 | 1.9631E−03 | −3.9017E−04 | −1.2621E−04 | −8.7385E−05 | −3.2512E−05 | −1.8171E−05 |
| S5 | −8.7028E−02 | −4.1889E−03 | −2.8098E−03 | −5.0329E−04 | −2.1316E−04 | −1.7612E−05 | −2.1850E−05 |
| S6 | −1.4935E−01 | 1.6146E−02 | −5.7246E−03 | −3.4604E−04 | −2.1283E−04 | 3.5976E−05 | −5.8736E−05 |
| S7 | −1.6379E−01 | 2.5740E−02 | −3.7225E−03 | 2.6414E−04 | −1.7219E−04 | −1.9749E−05 | −1.1955E−05 |
| S8 | −1.2666E−01 | −7.7128E−03 | 3.6304E−03 | 1.1787E−03 | 4.4449E−04 | 4.7587E−05 | −6.4631E−05 |
| S9 | 4.8661E−01 | −2.6241E−02 | 1.6333E−02 | −1.2911E−02 | 7.3620E−04 | −1.8740E−04 | −4.8087E−04 |
| S10 | 1.0068E+00 | −5.5287E−02 | 3.8416E−02 | −3.6427E−02 | 1.2190E−02 | −2.1810E−03 | 7.4774E−04 |
| S11 | −1.2147E+00 | −1.0282E−02 | 2.3690E−01 | −1.2407E−01 | 1.0850E−02 | 4.0648E−03 | 1.0203E−02 |
| S12 | −1.9510E+00 | 1.5358E−01 | 1.1659E−01 | −3.7223E−02 | −4.0172E−02 | 2.2541E−02 | −3.9989E−03 |
| S13 | −7.3469E+00 | 2.1104E+00 | −7.7256E−01 | 2.8987E−01 | −1.3894E−01 | 6.7657E−02 | −1.5440E−02 |
| S14 | −9.0690E+00 | 2.0176E+00 | −6.5886E−01 | 2.8580E−01 | −1.2574E−01 | 2.9097E−02 | −1.7512E−02 |

TABLE 14-2

| surface number | A18 | A20 | A22 | A24 | A26 | A28 | A30 |
|---|---|---|---|---|---|---|---|
| S1 | −6.7529E−05 | −3.7682E−07 | 9.1207E−06 | −5.7119E−06 | 0.0000E+00 | 0.0000E+00 | 0.0000E+00 |
| S2 | −2.5929E−04 | 6.0561E−05 | −2.1051E−06 | 2.6511E−05 | 0.0000E+00 | 0.0000E+00 | 0.0000E+00 |
| S3 | −1.7628E−04 | −4.7084E−05 | 0.0000E+00 | 0.0000E+00 | 0.0000E+00 | 0.0000E+00 | 0.0000E+00 |
| S4 | 3.6540E−06 | 3.9468E−07 | 0.0000E+00 | 0.0000E+00 | 0.0000E+00 | 0.0000E+00 | 0.0000E+00 |
| S5 | 6.4777E−07 | −4.4629E−07 | 2.6283E−06 | 0.0000E+00 | 0.0000E+00 | 0.0000E+00 | 0.0000E+00 |
| S6 | 2.7209E−05 | 5.7797E−07 | 5.9627E−06 | −1.5604E−06 | 0.0000E+00 | 0.0000E+00 | 0.0000E+00 |
| S7 | 9.6761E−05 | 1.1634E−05 | 7.2231E−06 | −5.1254E−06 | −8.1171E−07 | 0.0000E+00 | 0.0000E+00 |
| S8 | −4.0111E−05 | −8.3836E−06 | −2.4373E−06 | 5.4844E−06 | 2.2680E−06 | 0.0000E+00 | 0.0000E+00 |
| S9 | 1.9782E−04 | −1.4002E−04 | 2.2907E−05 | −2.0318E−05 | 7.9921E−06 | 3.6001E−06 | 0.0000E+00 |
| S10 | 1.3897E−04 | −3.3749E−04 | 1.1057E−04 | −2.1779E−05 | 5.4138E−06 | 3.1413E−07 | 0.0000E+00 |
| S11 | −9.2651E−03 | 1.6973E−03 | 1.2313E−03 | −7.0279E−04 | −3.1256E−04 | 4.2178E−04 | −1.1182E−04 |
| S12 | 1.2151E−02 | −1.5746E−02 | 8.2382E−03 | −3.3775E−03 | 3.3994E−03 | −2.5567E−03 | 7.1991E−04 |
| S13 | −4.4866E−03 | −3.4800E−03 | 1.4451E−02 | −1.2467E−02 | 5.7584E−03 | −6.1320E−04 | −6.6492E−04 |
| S14 | 2.1196E−02 | −1.0391E−02 | 4.3320E−03 | −3.8408E−03 | 1.0901E−03 | −1.0683E−03 | 8.4014E−04 |

Figure 14A:
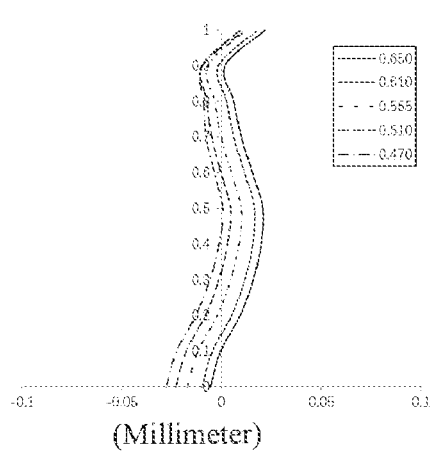
FIGS. 14A to 14D show longitudinal aberration curves, astigmatic curves, a distortion curve, and a lateral color curve of the optical imaging lens assembly of example 7, respectively.
Figure 14B:
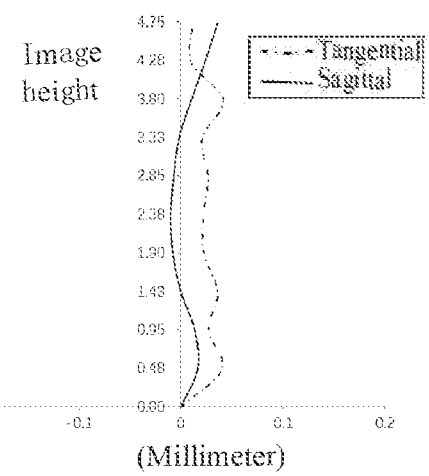
Figure 14C:
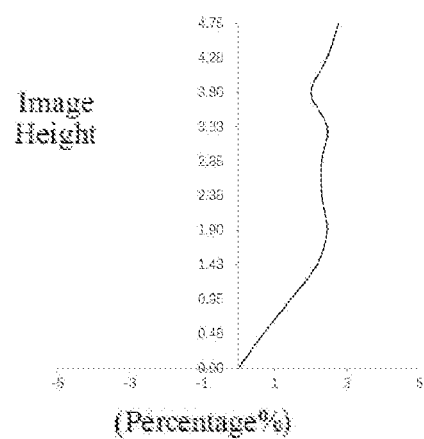
Figure 14D:
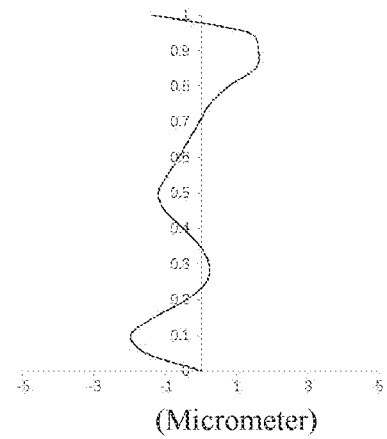

FIG. 14A shows longitudinal aberration curves of the optical imaging lens assembly of example 7, representing the deviation of the convergence focus of lights of different wavelengths passing through the lens assembly. FIG. 14B shows astigmatic curves of the optical imaging lens assembly of example 7, representing the curvatures of a tangential plane and the curvatures of a sagittal plane. FIG. 14C shows a distortion curve of the optical imaging lens assembly of example 7, representing the amounts of distortion corresponding to different image heights. FIG. 14D shows a lateral color curve of the optical imaging lens assembly of example 7 representing the deviation of different heights of images on the imaging plane formed by light passing through the optical imaging lens assembly. As can be seen from FIGS. 14A to 14D, the optical imaging lens assembly according to example 7 can achieve good imaging quality.

EXAMPLE 8

Figure 15:
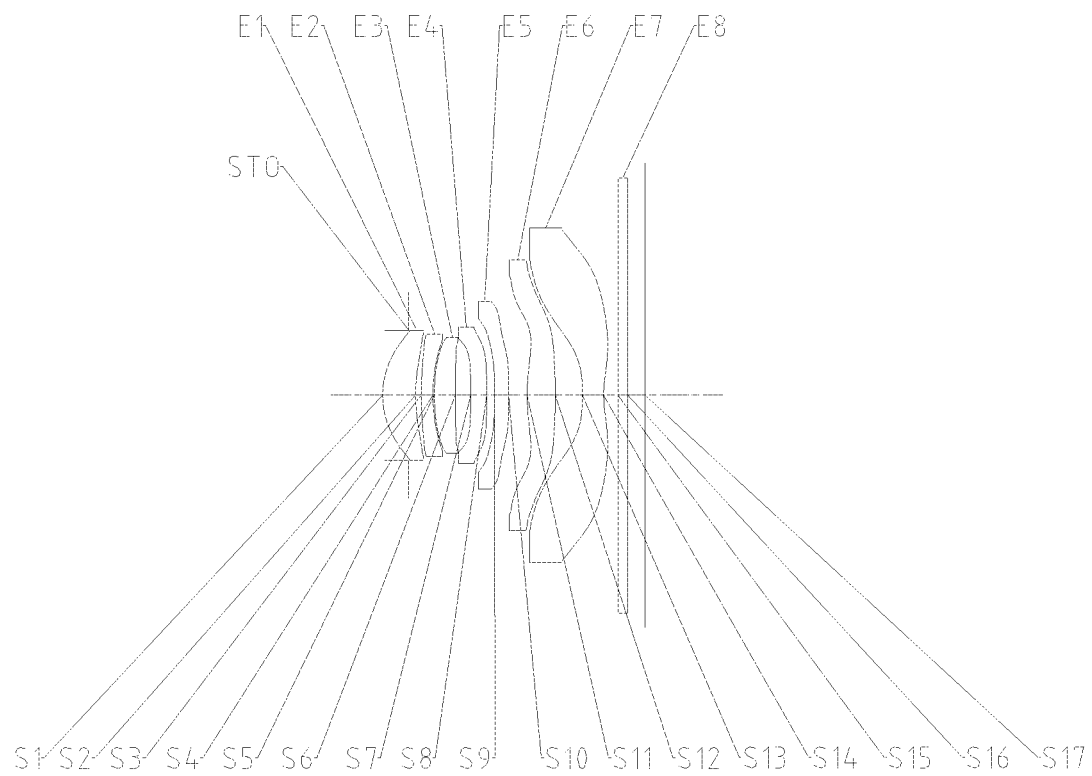
FIG. 15 is a schematic structural diagram of an optical imaging lens assembly according to example 8 of the present disclosure.

An optical imaging lens assembly according to example 8 of the present disclosure is described below with reference to FIGS. 15 to 16D. FIG. 15 shows a schematic structural diagram of an optical imaging lens assembly according to example 8 of the present disclosure.

As shown in FIG. 15, the optical imaging lens assembly includes a first lens E1, a second lens E2, a stop STO, a third lens E3, a fourth lens E4, a fifth lens E5, a sixth lens E6, a seventh lens E7, a filter E8, and an imaging surface S17 in sequence from the object side to the image side.

The first lens E1 has a negative refractive power, the object-side surface S1 of the first lens is a concave surface, and the image-side surface S2 of the first lens is a convex surface. The second lens E2 has a positive refractive power, the object-side surface S3 thereof is convex, and the image-side surface S4 thereof is concave. The third lens E3 has a negative refractive power, and its object-side surface S5 is concave, and its image-side surface S6 is concave. The fourth lens E4 has a positive refractive power, the object-side surface S7 thereof is a convex surface, and the image-side surface S8 thereof is a convex surface. The fifth lens E5 has a negative refractive power, the object-side surface S9 thereof is a concave surface, and the image-side surface S10 thereof is a convex surface. The sixth lens E6 has a positive refractive power, the object-side surface S11 thereof is a convex surface and the image-side surface S12 thereof is a concave surface. The seventh lens E7 has a negative refractive power, the object-side surface S13 thereof is a convex surface and the image-side surface S14 thereof is a concave surface. The filter E8 has an object-side surface S15 and an image-side surface S16. Light from the object sequentially passes through the respective surfaces S1 to S16 and is finally imaged on the imaging surface S17.

In this example, the total effective focal length f of the optical imaging lens assembly is 3.45 mm, the total length TTL of the optical imaging lens assembly is 6.29 mm, a half ImgH of the diagonal length of the effective pixel area on the imaging surface S17 of the optical imaging lens assembly is 4.74 mm, a half Semi-FOV of the maximum field-of-view of the optical imaging lens assembly is 53.59°, and an aperture value Fno of the optical imaging lens assembly is 2.03.

Table 15 is a table showing basic parameters of the optical imaging lens assembly of example 8, where the units of radius of curvature, the thickness/distance, and the focal length are millimeters (mm). Tables 16-1 and 16-2 show the high-order term coefficients that applicable to each aspheric surface in example 8, where the surface shape of each aspheric surface may be defined by formula (1) given in example 1 above.

TABLE 15

| surface number | Surface type | Radius of curvature | Thickness/ distance | Material Refractive index | Abbe number | Focal length | Conical coefficient |
|---|---|---|---|---|---|---|---|
| OBJ | Spherical surface | Infinite | Infinite | | | | |
| S1 | Aspheric surface | −3.3480 | 0.4328 | 1.55 | 56.1 | −24.98 | 0.0000 |
| S2 | Aspheric surface | −4.6397 | 0.1114 | | | | 0.0000 |
| S3 | Aspheric surface | 2.2212 | 0.6032 | 1.55 | 56.1 | 6.00 | 0.0000 |
| S4 | Aspheric surface | 6.2444 | 0.1044 | | | | 0.0000 |
| STO | Spherical surface | Infinite | 0.3181 | | | | |
| S5 | Aspheric surface | −28.0703 | 0.2600 | 1.67 | 19.2 | −12.49 | 0.0000 |
| S6 | Aspheric surface | 12.1436 | 0.0405 | | | | −98.9790 |
| S7 | Aspheric surface | 8.3013 | 0.8014 | 1.55 | 56.1 | 3.21 | 0.0000 |
| S8 | Aspheric surface | −2.1477 | 0.5680 | | | | 0.0000 |
| S9 | Aspheric surface | −0.7246 | 0.3612 | 1.67 | 19.2 | −4.14 | −1.0000 |
| S10 | Aspheric surface | −1.1737 | 0.0400 | | | | −1.0000 |
| S11 | Aspheric surface | 1.8345 | 0.7218 | 1.55 | 56.1 | 5.35 | −1.0000 |
| S12 | Aspheric surface | 4.2509 | 0.2677 | | | | 0.0000 |
| S13 | Aspheric surface | 1.3286 | 0.3900 | 1.55 | 56.1 | −25.96 | −1.0000 |
| S14 | Aspheric surface | 1.0888 | 0.4346 | | | | −1.0000 |
| S15 | Spherical surface | Infinite | 0.2100 | 1.52 | 64.2 | | |
| S16 | Spherical surface | Infinite | 0.6252 | | | | |
| S17 | Spherical surface | Infinite | | | | | |

TABLE 16-1

| surface number | A4 | A6 | A8 | A10 | A12 | A14 | A16 |
|---|---|---|---|---|---|---|---|
| S1 | 6.8886E−01 | −6.5152E−02 | 1.6118E−02 | −4.9244E−03 | 1.0003E−03 | −4.7330E−04 | 6.8182E−05 |
| S2 | 4.3282E−01 | −2.9589E−02 | 1.3421E−02 | −4.4068E−03 | 5.2645E−04 | −8.9186E−04 | 6.4325E−06 |
| S3 | 8.6984E−02 | −2.2528E−03 | 4.3306E−03 | −1.3318E−03 | −3.0098E−05 | −3.2371E−04 | −8.7466E−05 |
| S4 | −4.5315E−03 | 9.2225E−04 | −1.2421E−04 | −4.5364E−05 | −4.2680E−05 | −1.0590E−05 | −7.0934E−06 |
| S5 | −7.6746E−02 | −4.2658E−03 | −2.1413E−03 | −2.0477E−04 | −1.0249E−04 | 3.3574E−05 | −7.5723E−06 |
| S6 | −1.4772E−01 | 1.6805E−02 | −5.0860E−03 | 3.0245E−04 | −1.2765E−04 | 1.2831E−04 | −3.0844E−05 |
| S7 | −1 6141E−01 | 2.4125E−02 | −3.3294E−03 | 7.2268E−04 | −2.2445E−04 | 1.5764E−05 | −3.6238E−05 |
| S8 | −1.4403E−01 | −8.2990E−03 | 4.9657E−03 | 9.9589E−04 | 2.5731E−04 | −2.2642E−04 | −1.8330E−04 |
| S9 | 6.1341E−01 | −4.8887E−02 | 2.3300E−02 | −1.7247E−02 | 3.2621E−03 | −1.7826E−03 | 8.2142E−05 |
| S10 | 7.1302E−01 | 2.1440E−02 | 6.4998E−03 | −2.2434E−03 | 8.2321E−03 | −1.6469E−03 | 3.7271E−04 |
| S11 | −2.9600E+00 | 4.6495E−01 | 5.4671E−02 | −3.8830E−02 | −2.7450E−02 | 1.9162E−02 | −7.3528E−04 |
| S12 | −2.2222E+00 | 2.3424E−01 | 8.4208E−02 | −2.6098E−02 | −3.1071E−02 | 1.0152E−02 | 3.5821E−04 |
| S13 | −7.0989E+00 | 2.0818E+00 | −7.6917E−01 | 3.0269E−01 | −1.5260E−01 | 7.3643E−02 | −1.5167E−02 |
| S14 | −9.1785E+00 | 2.0885E+00 | −6.9960E−01 | 3.3021E−01 | −1.7023E−01 | 4.6971E−02 | −1.4972E−02 |

TABLE 16-2

| surface number | A18 | A20 | A22 | A24 | A26 | A28 | A30 |
|---|---|---|---|---|---|---|---|
| S1 | −3.5957E−05 | 3.5537E−06 | −1.5577E−06 | −6.0506E−06 | 0.0000E+00 | 0.0000E+00 | 0.0000E+00 |
| S2 | −1.2110E−04 | 3.7680E−05 | 7.9582E−06 | 1.2698E−05 | 0.0000E+00 | 0.0000E+00 | 0.0000E+00 |
| S3 | −6.5177E−05 | −1.3471E−05 | 0.0000E+00 | 0.0000E+00 | 0.0000E+00 | 0.0000E+00 | 0.0000E+00 |
| S4 | 2.4422E−06 | −3.4805E−06 | 0.0000E+00 | 0.0000E+00 | 0.0000E+00 | 0.0000E+00 | 0.0000E+00 |
| S5 | 9.1840E−06 | −4.8149E−06 | 2.6169E−06 | 0.0000E+00 | 0.0000E+00 | 0.0000E+00 | 0.0000E+00 |
| S6 | 3.5987E−05 | −1.1575E−05 | −4.9636E−06 | 3.9926E−06 | 0.0000E+00 | 0.0000E+00 | 0.0000E+00 |
| S7 | 6.3465E−05 | −1.0944E−05 | −8.5703E−06 | 3.1020E−06 | −2.0532E−07 | 0.0000E+00 | 0.0000E+00 |
| S8 | −6.2918E−05 | 3.1067E−05 | 1.9820E−05 | 1.2985E−05 | −2.5208E−06 | 0.0000E+00 | 0.0000E+00 |
| S9 | −1.2891E−04 | 1.1207E−04 | −8.8497E−05 | 3.7991E−06 | −1.2734E−06 | 9.9571E−06 | 1.3811E−06 |
| S10 | 1.3444E−04 | 4.2314E−05 | −1.5246E−04 | 4.1583E−05 | 4.2122E−06 | 3.1519E−07 | 0.0000E+00 |
| S11 | 4.5929E−04 | −2.6629E−03 | 2.0987E−03 | −8.7316E−04 | 8.9316E−05 | −1.3158E−04 | 9.2563E−05 |
| S12 | 9.9040E−03 | −1.4616E−02 | 8.3300E−03 | −8.2878E−04 | 7.9470E−04 | −1.8318E−03 | 6.1300E−04 |
| S13 | −7.0980E−03 | −2.3220E−04 | 1.0472E−02 | −1.1740E−02 | 6.1918E−03 | −1.1668E−03 | −3.3535E−05 |
| S14 | 1.5561E−02 | −4.5362E−03 | 1.6168E−03 | −7.4839E−03 | 3.6706E−03 | −1.3627E−03 | 1.1098E−03 |

Figure 16A:
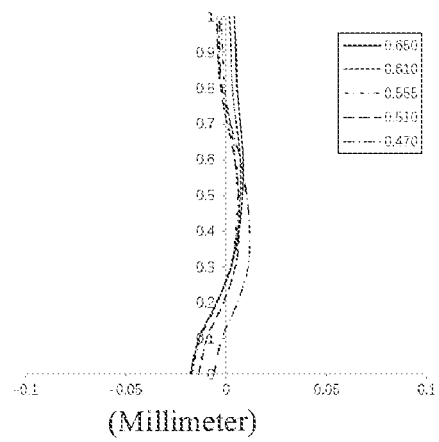
FIGS. 16A to 16D show longitudinal aberration curves, astigmatic curves, a distortion curve, and a lateral color curve of the optical imaging lens assembly of example 8 respectively.
Figure 16B:
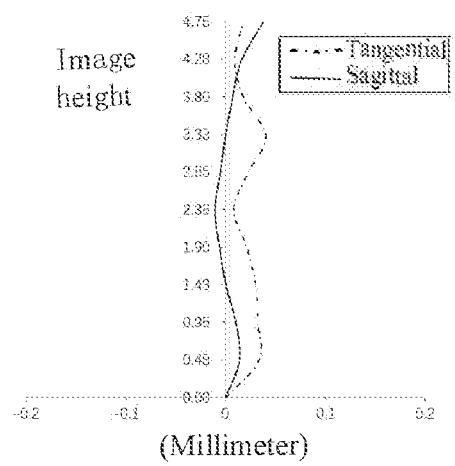
Figure 16C:
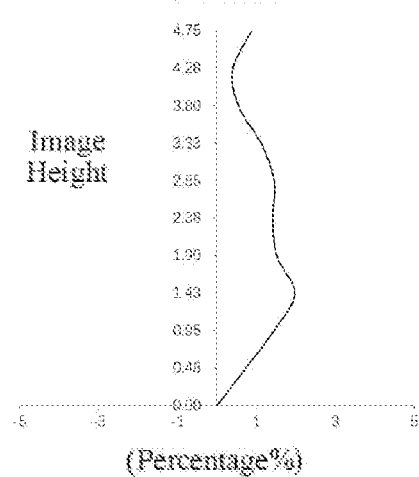
Figure 16D:
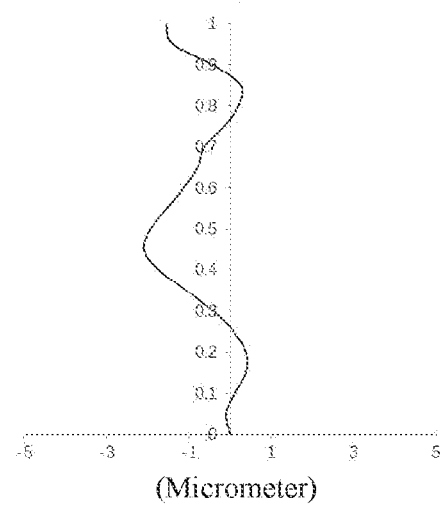

FIG. 16A shows longitudinal aberration curves of the optical imaging lens assembly of example 8, representing the deviation of the convergence focus of lights of different wavelengths passing through the lens assembly. FIG. 16B shows astigmatic curves of the optical imaging lens assembly of example 8, representing the curvatures of a tangential plane and the curvatures of a sagittal plane. FIG. 18C shows a distortion curve of the optical imaging lens assembly of example 8, representing the amounts of distortion corresponding to different image heights. FIG. 16D shows a lateral color curve of the optical imaging lens assembly of example 8 representing the deviation of different heights of images on the imaging plane formed by light passing through the optical imaging lens assembly. As can be seen from FIGS. 16A to 16D, the optical imaging lens assembly according to example 8 can achieve good imaging quality.

In view of the above, examples 1 to 8 respectively satisfy the relationship shown in Table 17.

TABLE 17

| Conditional/embodiment | 1 | 2 | 3 | 4 | 5 | 6 | 7 | 8 |
|---|---|---|---|---|---|---|---|---|
| TTL/ImgH | 1.34 | 1.34 | 1.34 | 1.31 | 1.33 | 1.25 | 1.34 | 1.33 |
| |f4 × tan (Semi-FOV)| (mm) | 4.70 | 4.47 | 5.04 | 4.87 | 4.62 | 5.23 | 4.20 | 4.36 |
| TTL × f/tan (Semi-FOV) (mm2) | 17.29 | 17.35 | 17.35 | 16.75 | 17.62 | 16.19 | 18.00 | 16.00 |
| |f2/R3 + f2/R4| | 3.47 | 3.59 | 3.56 | 3.63 | 3.67 | 3.45 | 3.72 | 3.66 |
| (R9 + R10)/R10 | 1.66 | 1.69 | 1.65 | 1.68 | 1.67 | 1.72 | 1.80 | 1.62 |
| (CT2 + CT3)/T23 | 1.80 | 1.89 | 1.87 | 1.90 | 1.93 | 2.15 | 1.91 | 2.06 |
| CT6/ΣCT | 0.22 | 0.23 | 0.23 | 0.20 | 0.27 | 0.21 | 0.17 | 0.20 |
| ΣCT/ΣAT | 1.90 | 2.38 | 2.17 | 2.40 | 2.73 | 2.42 | 2.30 | 2.47 |
| F123/f | 4.00 | 4.40 | 2.65 | 2.69 | 3.14 | 2.72 | 4.71 | 4.67 |
| |(SAG51 + SAG52)/CT5| | 5.05 | 4.88 | 5.40 | 3.44 | 4.45 | 4.55 | 4.29 | 4.18 |
| |(R9 + R10)/ET5| | 3.29 | 3.17 | 3.17 | 3.27 | 3.33 | 4.10 | 3.41 | 3.31 |
| F12/R3 + f12/R4 | 4.72 | 3.94 | 4.03 | 4.20 | 4.01 | 4.63 | 4.37 | 4.56 |
| |R14/SAG71 + R14/SAG72| | 7.71 | 6.67 | 7.64 | 5.23 | 6.29 | 4.11 | 6.22 | 7.14 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising a first lens, a second lens, a third lens, a fourth lens, a fifth lens, a sixth lens, and a seventh lens sequentially from an object side to an image side along an optical axis; wherein the first lens has a negative refractive power, an object-side surface of the first lens is a concave surface, and an image-side surface of the first lens is a convex surface;

the third lens has a negative refractive power; and a distance TTL from the object-side surface of the first lens to an imaging surface of the optical imaging lens assembly on the optical axis and ImgH being a half of a diagonal length of an effective pixel region on the imaging surface of the optical imaging lens assembly satisfy: TTL/ImgH≤1.4, wherein a radius R3 of curvature of an object-side surface of the second lens, a radius R4 of curvature of an image-side surface of the second lens, and a combined focal length f12 of the first lens and the second lens satisfy: 3.8≤f12/R3+f12/R4≤4.8.

2. The optical imaging lens assembly according to claim 1, wherein an effective focal length f2 of the second lens, a radius R3 of curvature of an object-side surface of the second lens, and a radius R4 of curvature of an image-side surface of the second lens satisfy: $3.0 \leq |f2/R3+f2/R4| \leq 4.0$.

3. The optical imaging lens assembly according to claim 1, wherein a radius R9 of curvature of an object-side surface of the fifth lens and a radius R10 of curvature of an image-side surface of the fifth lens satisfy: $1.5 \leq (R9+R10)/R10 \leq 2.0$.

4. The optical imaging lens assembly according to claim 1, wherein a center thickness CT2 of the second lens on the optical axis, a center thickness CT3 of the third lens on the optical axis, and a spaced interval T23 between the second lens and the third lens on the optical axis satisfy: $1.5 \leq (CT2+CT3)/T23 \leq 2.5$.

5. The optical imaging lens assembly according to claim 1, wherein a total effective focal length f of the optical imaging lens assembly and a combined focal length f123 of the first lens, the second lens and the third lens satisfy: $2.5 \leq f123/f \leq 5.0$.

6. The optical imaging lens assembly according to claim 1, wherein a central thickness CT5 of the fifth lens on the optical axis, an on-axis distance SAG51 from an intersection of an object-side surface of the fifth lens and the optical axis to a vertex of an effective radius of the object-side surface of the fifth lens, and an on-axis distance SAG52 from an intersection of an image-side surface of the fifth lens and the optical axis to a vertex of an effective radius of the image-side surface of the fifth lens satisfy: $3.2 \leq |(SAG51+SAG52)/CT5| \leq 5.5$.

7. The optical imaging lens assembly according to claim 1, wherein a radius R9 of curvature of an object-side surface of the fifth lens, a radius R10 of curvature of an image-side surface of the fifth lens, and an edge thickness ET5 of the fifth lens satisfy: $3.0 \leq |(R9+R10)/ET5| \leq 4.2$.

8. The optical imaging lens assembly according to claim 1, a radius R14 of curvature of the image-side surface of the seventh lens, an on-axis distance SAG71 from an intersection of an object-side surface of the seventh lens and the optical axis to a vertex of an effective radius of the object-side surface of the seventh lens, and an on-axis distance SAG72 from an intersection of the image-side surface of the seventh lens and the optical axis to a vertex of an effective radius of the image-side surface of the seventh lens satisfy: $4.0 \leq |R14/SAG71+R14/SAG72| \leq 8.0$.

9. The optical imaging lens assembly according to claim 1, an effective focal length f4 of the fourth lens and a half Semi-FOV of a maximum field-of-view of the optical imaging lens assembly satisfy: $|f4 \times \tan(\text{Semi-FOV})| < 6.0$ mm.

10. The optical imaging lens assembly according to claim 1, a distance TTL from the object-side surface of the first lens to the imaging surface of the optical imaging lens assembly on the optical axis, a total effective focal length f of the optical imaging lens assembly, and a half Semi-FOV of a maximum field-of-view of the optical imaging lens assembly may satisfy: $16 \text{ mm}^2 \leq TTL \times f/\tan(\text{Semi-FOV}) \leq 18 \text{ mm}^2$.

11. The optical imaging lens assembly according to claim 1, a sum $\Sigma CT$ of center thicknesses of the first lens to the seventh lens on the optical axis and the center thickness CT6 of the sixth lens on the optical axis satisfy: $CT6/\Sigma CT \leq 0.3$.

12. The optical imaging lens assembly according to claim 1, a sum $\Sigma CT$ of center thicknesses of the first lens to the seventh lens on the optical axis and a sum $\Sigma AT$ of spaced intervals of any two adjacent lenses in the first lens to the seventh lens on the optical axis satisfy: $1.8 \leq \Sigma CT/\Sigma AT \leq 3.0$.

13. An optical imaging lens assembly, comprising a first lens, a second lens, a third lens, a fourth lens, a fifth lens, a sixth lens, and a seventh lens sequentially from an object side to an image side along an optical axis; wherein
   the first lens has a negative refractive power, an object-side surface of the first lens is a concave surface, and an image-side surface of the first lens is a convex surface;
   the third lens has a negative refractive power;
   the fourth lens has a positive refractive power; and
   a distance TTL from the object-side surface of the first lens to the imaging surface of the optical imaging lens assembly on the optical axis and ImgH being a half of a diagonal length of an effective pixel region on the imaging surface of the optical imaging lens assembly satisfy: $TTL/ImgH \leq 1.35$,
   wherein a radius R3 of curvature of an object-side surface of the second lens, a radius R4 of curvature of an image-side surface of the second lens, and a combined focal length f12 of the first lens and the second lens satisfy: $3.8 \leq f12/R3+f12/R4 \leq 4.8$.

14. The optical imaging lens assembly according to claim 13, an effective focal length f2 of the second lens, a radius R3 of curvature of an object-side surface of the second lens, and a radius R4 of curvature of an image-side surface of the second lens may satisfy: $3.0 \leq |f2/R3+f2/R4| \leq 4.0$.

15. The optical imaging lens assembly according to a radius R9 of curvature of an object-side surface of the fifth lens and a radius R10 of curvature of an image-side surface of the fifth lens satisfy: $1.5 \leq (R9+R10)/R10 \leq 2.0$.

16. The optical imaging lens assembly according to claim 13, a center thickness CT2 of the second lens on the optical axis, a center thickness CT3 of the third lens on the optical axis, and a spaced interval T23 between the second lens and the third lens on the optical axis satisfy: $1.5 \leq (CT2+CT3)/T23 \leq 2.5$.

17. The optical imaging lens assembly according to claim 13, a total effective focal length f of the optical imaging lens assembly and a combined focal length f123 of the first lens, the second lens and the third lens satisfy: $2.5 \leq f123/f \leq 5.0$.

18. The optical imaging lens assembly according to claim 13, a central thickness CT5 of the fifth lens on the optical axis, an on-axis distance SAG51 from an intersection of an object-side surface of the fifth lens and the optical axis to a vertex of an effective radius of the object-side surface of the fifth lens, and an on-axis distance SAG52 from an intersection of an image-side surface of the fifth lens and the optical axis to a vertex of an effective radius of the image-side surface of the fifth lens satisfy: $3.2 \leq |(SAG51+SAG52)/CT5| \leq 5.5$.

19. An optical imaging lens assembly, comprising a first lens, a second lens, a third lens, a fourth lens, a fifth lens, a sixth lens, and a seventh lens sequentially from an object side to an image side along an optical axis; wherein
   the first lens has a negative refractive power, an object-side surface of the first lens is a concave surface, and an image-side surface of the first lens is a convex surface;
   the third lens has a negative refractive power;
   a distance TTL from the object-side surface of the first lens to an imaging surface of the optical imaging lens assembly on the optical axis and ImgH being a half of a diagonal length of an effective pixel region on the imaging surface of the optical imaging lens assembly satisfy: $TTL/ImgH \leq 1.4$; and
   an effective focal length f4 of the fourth lens and a half Semi-FOV of a maximum field-of-view of the optical imaging lens assembly satisfy: $|f4 \times \tan(\text{Semi-FOV})| < 6.0$ mm wherein a radius R3 of curvature of an object-side surface of the second lens, a radius R4 of curvature of an image-side surface of the second lens, and a combined focal length f12 of the first lens and the second lens satisfy: $3.8 \leq f12/R3 + f12/R4 \leq 4.8$.

\* \* \* \* \*